(12) United States Patent
Kwon et al.

(10) Patent No.: US 6,407,530 B1
(45) Date of Patent: Jun. 18, 2002

(54) DEVICE AND METHOD FOR CONTROLLING SUPPLY OF CURRENT AND STATIC CAPACITANCE TO COMPRESSOR

(75) Inventors: Soon Kwang Kwon, Pusan-shi; Sung Yeob Lim, Kyongsangnam-do; Gyeong Yeol Noh, Kyongsangnam-do; Chang Woong An, Kyongsangnam-do; Kam Gyu Lee, Pusan-shi, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/676,506

(22) Filed: Oct. 2, 2000

(30) Foreign Application Priority Data

| | | |
|---|---|---|
| Nov. 12, 1999 | (KR) | 99-50263 |
| Jul. 1, 2000 | (KR) | 2000-37562 |
| Jul. 1, 2000 | (KR) | 2000-37563 |
| Jul. 1, 2000 | (KR) | 2000-37564 |
| Jul. 1, 2000 | (KR) | 2000-37565 |
| Jul. 1, 2000 | (KR) | 2000-37566 |
| Jul. 1, 2000 | (KR) | 2000-37570 |

(51) Int. Cl.$^7$ ............................................ H02P 1/26
(52) U.S. Cl. ........................ 318/778; 318/785; 318/788
(58) Field of Search ................................ 318/788, 780, 318/787, 782, 778, 793, 783, 785

(56) References Cited

U.S. PATENT DOCUMENTS

| 4,012,678 | A | * | 3/1977 | Blaha ...................... 318/221 R |
| 4,084,202 | A | * | 4/1978 | Stoll ............................ 361/24 |
| 4,107,583 | A | * | 8/1978 | Houtman ................ 318/221 R |
| 4,465,960 | A | * | 8/1984 | Pfarrer ........................ 318/774 |
| 4,465,962 | A | * | 8/1984 | Kirschbaum ................. 318/817 |
| 5,451,853 | A | * | 9/1995 | Itoh ............................ 318/788 |
| 5,559,418 | A | * | 9/1996 | Burkhart ...................... 318/785 |
| 5,561,357 | A | * | 10/1996 | Schroeder .................... 318/789 |
| 6,040,679 | A | * | 3/2000 | Monk et al. ................. 318/778 |
| 6,249,104 | B1 | * | 6/2001 | Janicek ........................ 318/791 |

* cited by examiner

Primary Examiner—Khanh Dang
Assistant Examiner—Rina I. Duda
(74) Attorney, Agent, or Firm—Birch, Stewart, Kolasch & Birch, LLP

(57) ABSTRACT

A device and method for controlling a supply of a current and a static capacitance to a compressor are disclosed. The device includes a control signal generating part for controlling a current and a static capacitance provided to the compressor, such that the current and static capacitance differ in a starting period of the compressor versus an operative period of the compressor, after the starting period.

67 Claims, 13 Drawing Sheets

| voltage comparison | turn on time of triac(ms) |
|---|---|
| Vs<Vd1 | L1 |
| Vd1≤Vs≤Vd2 | L2 |
| Vd2≤Vs≤Vd3 | L3 |
| Vd3≤Vs≤Vd4 | L4 |
| Vd4≤Vs | L5 |

| voltage comparison | turn on time of the third swith(ms) |
|---|---|
| Vs<Vd1 | R1 |
| Vd1≤Vs≤Vd2 | R2 |
| Vd2≤Vs≤Vd3 | R3 |
| Vd3≤Vs≤Vd4 | R4 |
| Vd4≤Vs | R5 |

DEVICE AND METHOD FOR CONTROLLING SUPPLY OF CURRENT AND STATIC CAPACITANCE TO COMPRESSOR

BACKGROUND OF THE INVENTION

1. Field of the Invention

The present invention relates to device and method for controlling supply of current and static capacitance to a compressor.

2. Background of the Related Art

FIG. 1 illustrates a diagram showing a related art device for controlling supply of current and static capacitance to a compressor.

Referring to FIG. 1, a related art device for controlling supply of current and static capacitance to a compressor is provided with a utility power supply 1, a first relay 2 for being turned on/off in response to a control signal from the compressor, a reactor 3 for absorbing a reactive power from the utility power supplied through the utility power supply 1 according to the turning on/off operation of the first relay 2, and providing the utility power to a main winding C1. of a compressor motor 'M', a second relay 4 for monitoring a voltage on the reactor 3, a first contact 4a connected parallel to the third reactor 3 for being opened or closed by the second relay 4, an operating capacitor 5 connected in parallel to the third reactor 3, a starting capacitor 6 connected in parallel with the operating capacitor 5, a third relay 7 for monitoring a voltage at starting, a second contact 7a fitted to a fore end of the second relay 4 for being opened or closed by the third relay, and a third contact 7b fitted to a rear end of the starting capacitor.

The operation of the foregoing related art device will be explained.

Upon application of the control signal from the compressor, the first relay 2 is turned on, to supply a power to the main winding C1 of the compressor motor 'M' through the third reactor 3. In this instance, the third reactor 3 removes a reactive power from the power to the main winding. On the other hand, the utility power is supplied to a supplementary winding of the compressor motor 'M' through the parallel circuit of the operating capacitor 5 and the starting capacitor 6 as the third contact 7b is closed. Referring to a region 8 in FIG. 1, at an initial starting of the compressor, since the compressor motor 'M' is not rotated, a voltage to the third relay 7 is too low to put the third relay 7 into action. And, if the compressor motor 'M' becomes to rotate at a revolution higher than a preset value as the voltage on the third relay 7 rises according to the rotation of the compressor motor 'M', the third relay 7 comes into action, to close the second contact 7a and to open the third contact 7b. Since the second relay 4 comes into action as the second contact 7a is closed, the first contact 4a is closed to turn off the third reactor 3 and to open the third contact 7b, to isolate the starting capacitor from the circuit. That is, at the moment of starting, the third reactor 3 becomes to be connected to the compressor motor 'M' in series to limit an excessive current, and the starting capacitor 6 provides a greater capacitance to the supplementary winding C2 to improve starting characteristics of the compressor.

However, the related art device for controlling supply of power to a compressor has the following disadvantages.

First, there have been frequent troubles in the region 8 at which a starting capacitance is controlled.

Second, the mechanical system of the device for supplying power to the compressor costs high.

Third, the starting control by the voltage rise following rotation of the compressor motor 'M' can not define a starting current accurately and has a poor starting characteristic.

Fourth, the generation of excessive current in starting of the compressor actuates the circuit breaker, gives bad influences to peripheral device of the compressor, and has inconvenience in restoring the compressor to an original state.

SUMMARY OF THE INVENTION

Accordingly, the present invention is directed to device and method for controlling supply of current and static capacitance to a compressor that substantially obviates one or more of the problems due to limitations and disadvantages of the related art. An object of the present invention is to provide device and method for controlling supply of current and static capacitance to a compressor, which can prevent flow of excessive current to a main winding of the compressor.

Other object of the present invention is to provide device and method for controlling supply of current and static capacitance to a compressor, which can supply a stable voltage to the compressor regardless of variation of an external utility voltage.

Another object of the present invention is to provide device and method for controlling supply of current and static capacitance to a compressor, which can prevent internal contacts suffer from damage caused by sharp current concentration during starting and operation of the compressor.

Further object of the present invention is to provide device and method for controlling supply of current and static capacitance to a compressor, which can make stable supply of current and static capacitance to the compressor to be consistent to an external temperature and season.

Still further object of the present invention is to provide device and method for controlling supply of current and static capacitance to a compressor, which can improve starting characteristics of the compressor.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for controlling supply of current and static capacitance to a compressor includes a control signal generating part for providing a control signal for controlling a current and a static capacitance provided to the compressor different in starting and after the starting, a current controlling part for limiting a current of a utility voltage in supplying the current to a main winding in starting and releasing the limiting after the starting by changing an internal circuit in response to the control signal, and a static capacitance controlling part for supplying a starting static capacitance and an operative static capacitance from the current of the utility voltage to a supplementary winding in starting, and the operative static capacitance after the starting by the change of the internal circuit in response to the control signal.

In another aspect of the present invention, there is provided a method for controlling supply of current to a compressor, including the steps of (a) limiting a current of a utility voltage in supplying the current to a main winding during starting the compressor, and releasing the limiting after the starting, and (b) providing a starting static capacitance and an operative static capacitance form the current to a supplementary winding during the starting of the compressor, and the operative static capacitance after the starting.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
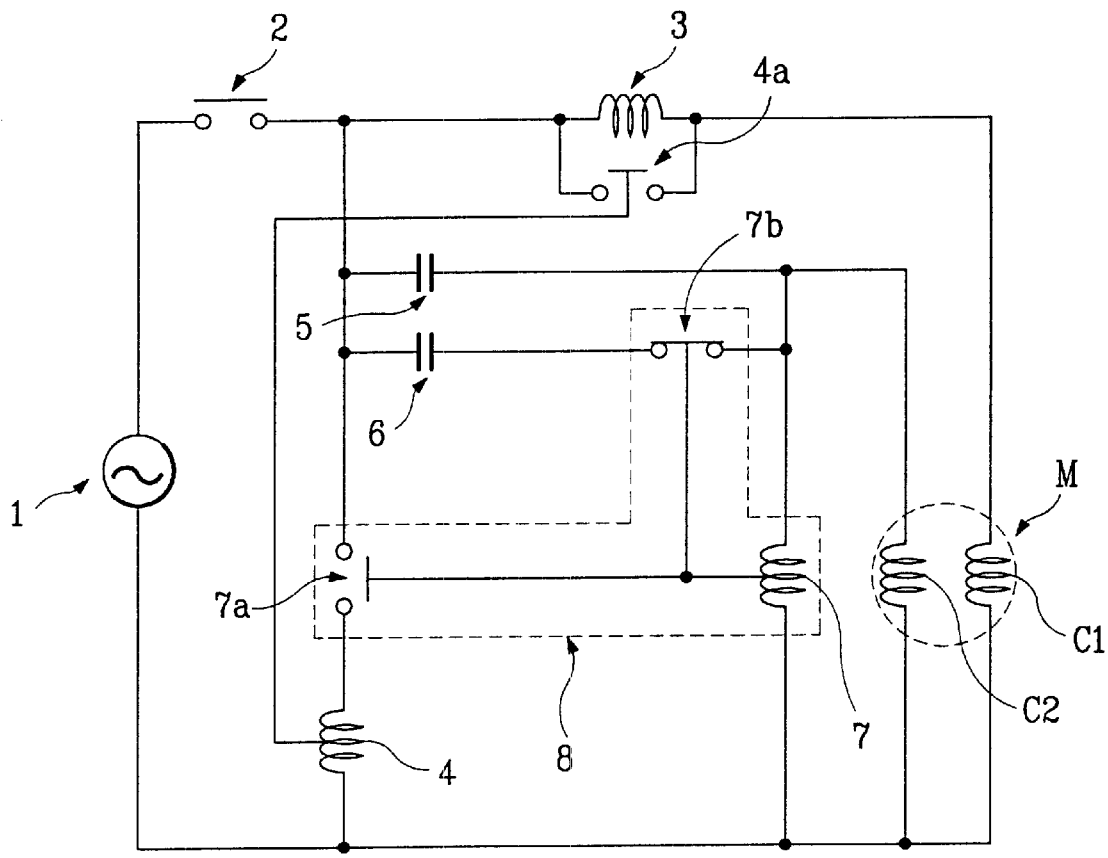
FIG. 1 illustrates a diagram showing a related art device for controlling supply of current and static capacitance to a compressor.
Figure 2:
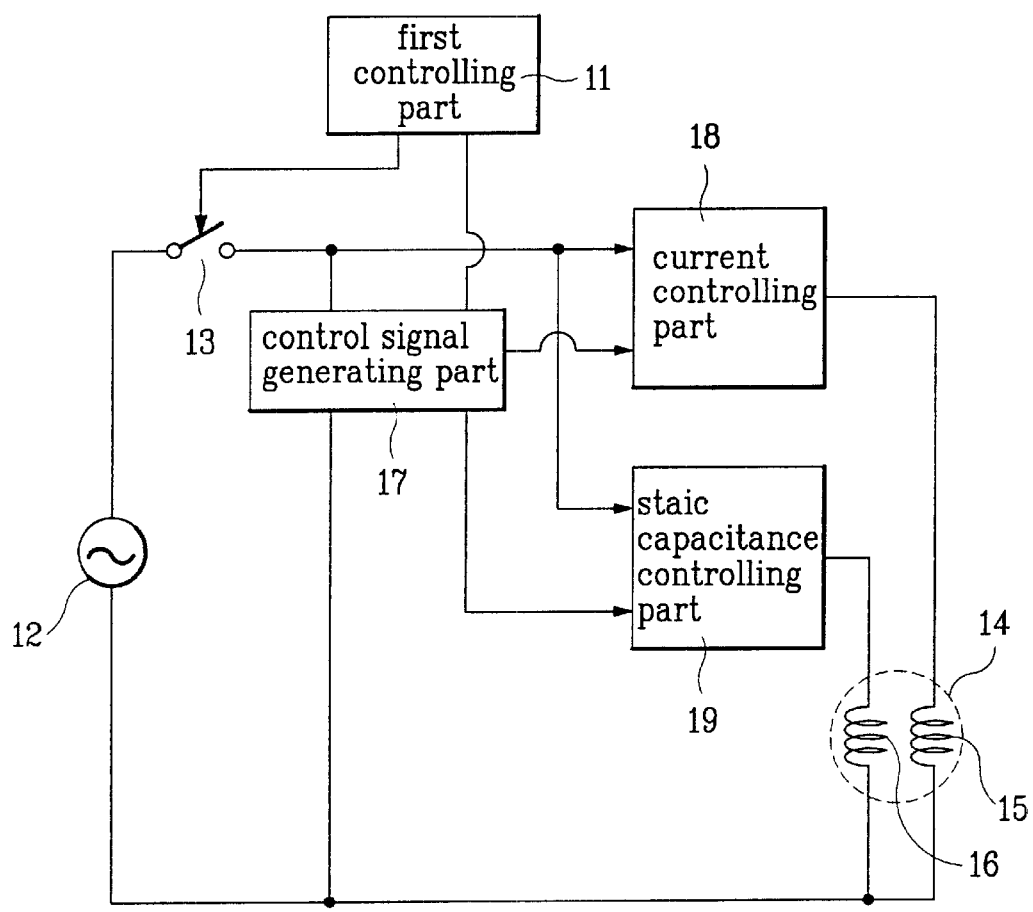
FIG. 2 illustrates a diagram showing concept of a device for controlling supply of current and static capacitance to a compressor of the present invention.

Reference will now be made in detail to the preferred embodiments of the present invention, examples of which are illustrated in the accompanying drawings. FIG. 2 illustrates a diagram showing concept of a device for controlling supply of current and static capacitance to a compressor of the present invention.

Referring to FIG. 2, the device for controlling supply of current and static capacitance to a compressor of the present invention includes a first controlling part 11 for controlling overall operation of the compressor, and generating a turn on/off signal for the compressor according to a user's selection, a utility power supply 12 for providing a utility power, a switch 13 operative in response to the turn on signal of the compressor from the first controlling part 11, a control signal generating part 17 for providing a control signal for controlling external power supply to a main winding 15 and a supplementary winding 16 of the compressor 14 to vary with a state of the utility power supply, and before and after the starting, a current controlling part 18 for limiting a current of the utility power supplied to the main winding during starting in response to the control signal and releasing the limiting of the current supplied to the main winding after the starting, and a static capacitance controlling part 19 for supplying a starting static capacitance and operative static capacitance from a current of the utility power to the supplementary winding during starting, and supplying the operative static capacitance after the starting in response to the control signal.

Figure 3:
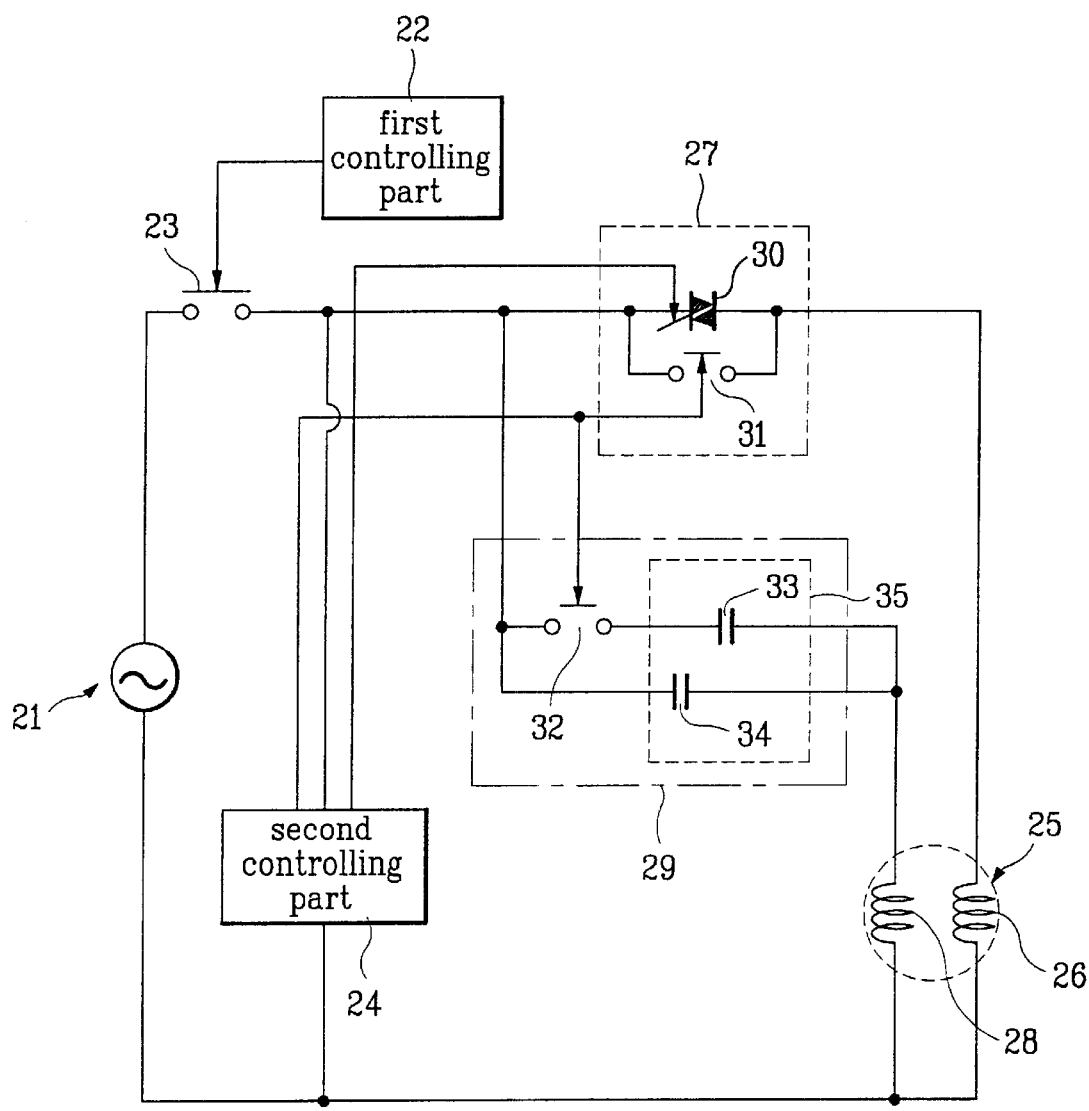
FIG. 3 illustrates a diagram showing a device for controlling supply of current and static capacitance to a compressor in accordance with a first preferred embodiment of the present invention.

FIG. 3 illustrates a diagram showing a device for controlling supply of current and static capacitance to a compressor in accordance with a first preferred embodiment of the present invention.

Referring to FIG. 3, the device for controlling supply of current and static capacitance to a compressor in accordance with a first preferred embodiment of the present invention includes a utility power supply 21, a first controlling part 22 for controlling overall operation of the compressor, and providing a driving signal for the compressor 25 according to a user's selection, a first switch 23 for being switched in response to the turn on/off signal for the compressor for supplying the utility power or cutting off the supplying of the utility power to the compressor, a second controlling part 24 for providing a phase control signal and a switching control signal varied with a state of the utility power supply, and different before and after the starting, a current controlling part 27 for changing an internal circuit system in response to the switching controlling signal and controlling a phase of the current of the utility power in response to the phase control signal for limiting the current in supplying the current to the main winding 26 of the compressor 25 during starting and releasing the limiting of the current after the starting, and a static capacitance controlling part 29 for varying an internal circuit in response to the switching control signal and supplying a starting static capacitance and operative static capacitance from a current of the utility power to the supplementary winding 28 of the compressor 25 during starting, and supplying only the operative static capacitance to the supplementary winding 28 of the compressor 25 after the starting in response to the control signal. The current controlling part 27 supplies current to the main winding 26 in a direction the current is increased gradually between an initial starting point to a starting completion point in response to the phase control signal and the switching control signal. And, the current controlling part 27 includes a second switch 31 for switching over an output side of the first switch 23 and the main winding 26 in response to the switching control signal, or turned off, and a phase controlling part 30(a triac in this embodiment) connected in parallel to the second switch 31 between an input and an output of the second switch 31 for controlling a phase of the utility power supplied to the main winding 26 depending on switching on/off of the second switch 31. The static capacitance controlling part 29 includes a third switch 32 for switching over the supplementary winding 28 and the output of the first switch 23 opposite to the second switch 31 in response to the switching control signal, and a static capacitance generating part 35 connected between the third switch 32 and the supplementary winding 28 for generating a required static capacitance to the supplementary winding 28 depending on switching on/off of the third switch 32. For stabilization, the second switch 31 and the third switch 32 have an overlap time period in which both the second switch 31 and the third switch are in operation.

In the meantime, in response to the switching control signal, the second switch 31 connects the output side of the first switch 23 and the main winding 26 through the phase controlling part 35 in starting of the compressor 25, and directly after the starting of the compressor 25. The third switch 32 is switched in response to the switching control signal, to change an internal circuit such that the static capacitance generating part 35 has a great static capacitance in starting and a limited static capacitance after the starting. As explained, the triac 30 as the phase controlling part receives the phase control signal of the second controlling part 24 as a gate voltage thereof for controlling a phase of the utility power. In general, the gate voltage is in a pulse form, and has a great duty ratio when a voltage of the utility power is lower than a reference value and a small duty ratio when the voltage is higher than the reference. As shown in FIG. 3, the static capacitance generating part 35 includes a starting capacitor 33 connected between an output contact point of the third switch 32 and the supplementary winding 28, and operating capacitor 34 connected between an input contact point of the third switch 32 and the supplementary winding 28 in parallel to the starting capacitor 33. That is, the starting capacitor 33 and the operating capacitor 34 are connected in parallel to each other during starting for providing a starting torque capacitance by switching of the third switch 32, but only the operating capacitor 34 is used after the starting.

Figure 4:
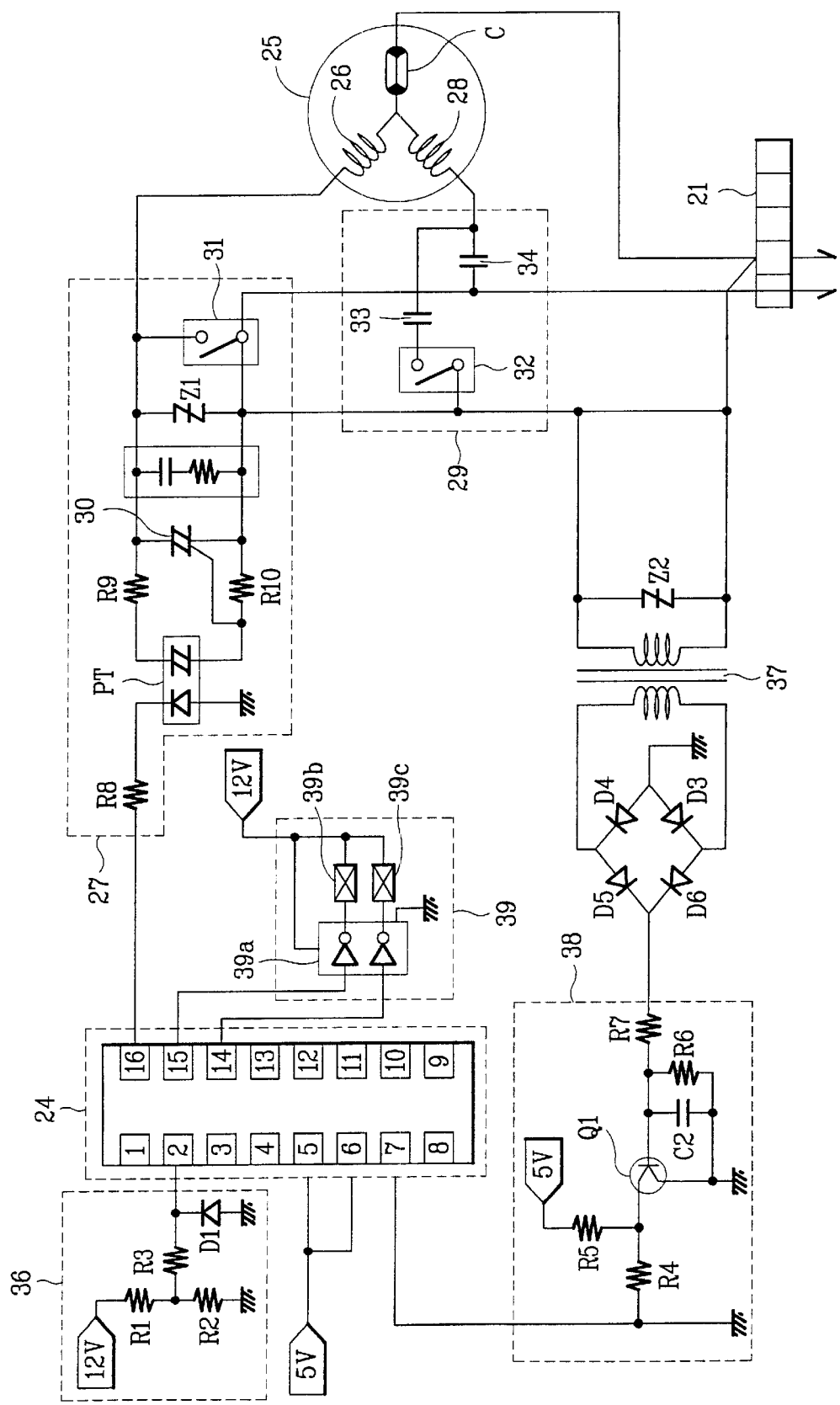
FIG. 4 illustrates a detailed circuit of the device shown in FIG. 3.

FIG. 4 illustrates a detailed circuit of the device shown in FIG. 3.

Referring to FIG. 4, the transformer 37 obtains at least one voltage of desired sizes from the utility power supply 10. A voltage sensing part 36 senses a size of the voltage of the provided utility power and provides to the second controlling part 24. A frequency sensing part 38 senses a frequency of the voltage of the external utility power by using the voltage provided from the transformer, and provides to the second controlling part 24. The second controlling part 24 generates different control signals depending on the size and frequency of the voltage of the external utility power sensed through the voltage sensing part 36 and the frequency sensing part 38, and provides to the current controlling part 27 and the static capacitance controlling part 29. Eventually, during the compressor 25 is started, the starting supplementary winding 28 has the starting static capacitance and the operating static capacitance from the current of the received utility power provided thereto, while the main winding 26 has the limited current of the utility power is provided thereto. However, even if the size of the voltage of the utility power is changed, the current to the main winding 26 is constant owing to the second controlling part 24 and the current controlling part 27. During the compressor 25 is started and operated, the starting supplementary winding 28 only has the operating capacitance provided thereto, and the main winding 26 has unlimited current of the utility power provided thereto. When there is a change of the size of the voltage of the utility power the same with a case of starting, the second controlling part 24 provides the control signal, i.e., the phase control signal, to the triac 30 in the current controlling part 27, for varying the current to the main winding 26 with the voltage of the utility power. In FIG. 4, unexplained reference symbols R1–R10 denote resistors, C1–C6 denote capacitors, D1–D6 denote diodes, Z1–Z2 denotes Zener diodes, and PT denotes a photo transistor which provides a driving voltage to the gate of the triac.

Figure 5A:
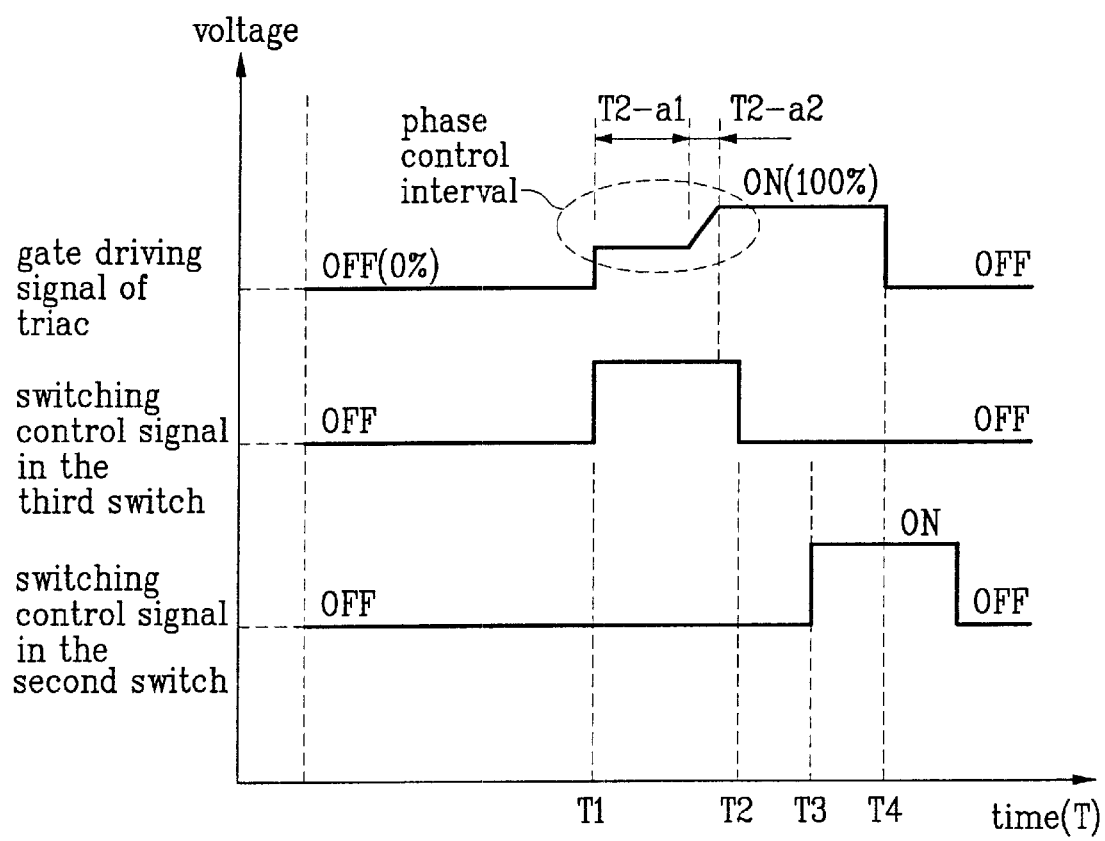
FIG. 5 illustrates a timing diagram of the first embodiment device of the present invention.

The operation of the first embodiment device for controlling supply of current and static capacitance to a compressor of the present invention will be explained with reference to FIGS. 3~6. FIG. 5A illustrates a timing diagram of signals provided to the triac, the second switch, and the third switch in FIG. 4, FIG. 5B shows a comparison table for fixing a triac conduction time period, and FIG. 5C shows a comparison table for fixing a conduction time period of the third switch in FIG. 3.

Upon reception of the voltage of the utility power supply 21(a utility voltage), the transformer 37 provides internal voltages required for the control device from the utility voltage. Then, the second controlling part(a microcomputer) 24 in the control device is initialized, such that, as shown in FIG. 5, the voltage sensing part 36 provides a voltage divided by resistors R1 and R2 to the second controlling part 24 for a time period T1. The frequency sensing part 38 receives and senses a frequency of the utility voltage, and provides to the second controlling part. The second controlling part 24 receives the divided voltage and the frequency and determines a state of the utility voltage. Then, the second controlling part 24 generates a phase control signal and a switching control signal for providing to the current controlling part 27 and the static capacitance controlling part 29 according to the determined state of the utility voltage. A starting time is determined, in which the utility power is provided to the starting capacitor 33 of the static capacitance controlling part 29, and the switching control signal is generated, and provided to the second switch 31 and the third switch 32. According to the switching control signal, the third switch 32 is turned on and the second switch 31 is turned off. And, the second controlling part 24 provides the phase control signal for controlling the phase of the utility voltage supplied to the main winding 26. With the phase control signal, the phase controlling part(or triac) 30 is driven, and the voltage or current provided to the main winding 26 is varied. As explained, the phase control signal is a rectangular signal provided to the gate of the triac 30, a duty ratio thereof is fixed based on a voltage provided from the voltage sensing part 36, and an output time point thereof is fixed based on the frequency value provided from the frequency sensing part 38. The supplementary winding 28 of the compressor 25 is required to be provided with a great static capacitance for improving starting characteristics. Accordingly, the operating capacitor 34 and the starting capacitor 33 are connected in parallel by the operation of the third switch 32, to provide a large capacitance to the supplementary winding 28 during starting.

In the meantime, once the starting is completed, only a capacitance from the operating capacitor 24 is provided to the supplementary winding 28 as the third switch 32 is turned off (or opened) during operation of the compressor 25. As explained, the phase control signal and the switching control signal for the compressor 25 are dependent on the state of the utility voltage. That is, if the utility voltage is lower than preset overvoltages, turn on time periods of the triac 30 and the third switch 32 are fixed longer, to make the compressor started at a lower voltage. And, if the utility voltage is higher than preset overvoltages, turn on time periods of the triac 30 and the third switch 32 are fixed shorter, for preventing flow of an excessive current to the supplementary winding 26. In FIGS. 5B and 5C, Vs denotes an AC voltage of the utility power supply 21, Vd1–Vd4 denote DC overvoltages preset at the second controlling part 24, L1–L4 denote turn on time periods of the triac 30, and R1–R4 are turn on time periods of the third switch 32. The phase control signal is started to be supplied to the triac 30 in response to a frequency signal sensed through the frequency sensing part 38. That is, starting from a time point a signal form the frequency sensing part 38 rises from '0'V to '5V', a timer(not shown) in the second controlling part 24 is driven, and the triac 30 comes into operation in response to the phase control signal of a rectangular form fixed according to the state of the utility voltage. As shown in FIG. 5A, as the phase control signal, a fixed voltage of a limited size is provided to the gate of the triac 30 such that a fixed current of a limited size flows to the main winding 26 for a first time period T-a1, a gradually rising voltage is provided to the gate of the triac 30 such that an increasing current flows to the main winding 26 for an a second time period T-a2, and a voltage of a normal size is provided to the gate of the triac 30 such that a normal current flows to the main winding 26 after the second time period T-a2. As explained, if the third switch 32 is turned on and the triac 30 comes into operation, to start the compressor 25, the third switch 32 is turned off to leave open after the time T2, to cut off the static capacitance supplied to the supplementary winding 28 through the starting capacitor 33. Accordingly, during operation of the compressor 25, the operating static capacitance is supplied to the supplementary winding 28 only through the operating capacitor 34. When a time period T3–T2 is passed after the third switch 32 is turned off, the second switch 31 is turned on, to lead the current of the utility power to the main winding 26 through the turned on second switch 31 instead of the triac 30. In this instance, for stable operation of the control device, the triac 30 is kept turned on for a time period T4–T2 even after the third switch 32 is turned off and the second switch 31 is turned on. After a time point T4, the current is provided to the main winding 26 only through the turned on second switch 31. Accordingly, the current of this time is not the limited size in the starting, but a normal size of the utility voltage. On the other hand, if the first switch 23 is turned off to leave open in response to a compressor driving control signal from the first controlling part 22, as a main controlling part shown in FIG. 3, the utility voltage is supplied to the compressor 25 no more, to stop operation of the compressor 25.

As explained, the first embodiment device for controlling supply of current and static capacitance to a compressor of the present invention has the following advantages.

The starting time and a size of the phase control signal are controlled according to a state of the utility voltage. And, the triac is used for controlling the phase, and a gate driving signal for the triac has a value gradually increased from a fixed voltage of a limited size during the starting. Accordingly, flow of an excessive current to the main winding can be prevented during starting of the compressor, to permit a significant improvement of starting characteristics of the compressor. And, as unnecessary power cut off to the compressor is prevented, affects to the peripheral devices can be prevented.

Second Embodiment

Figure 6:
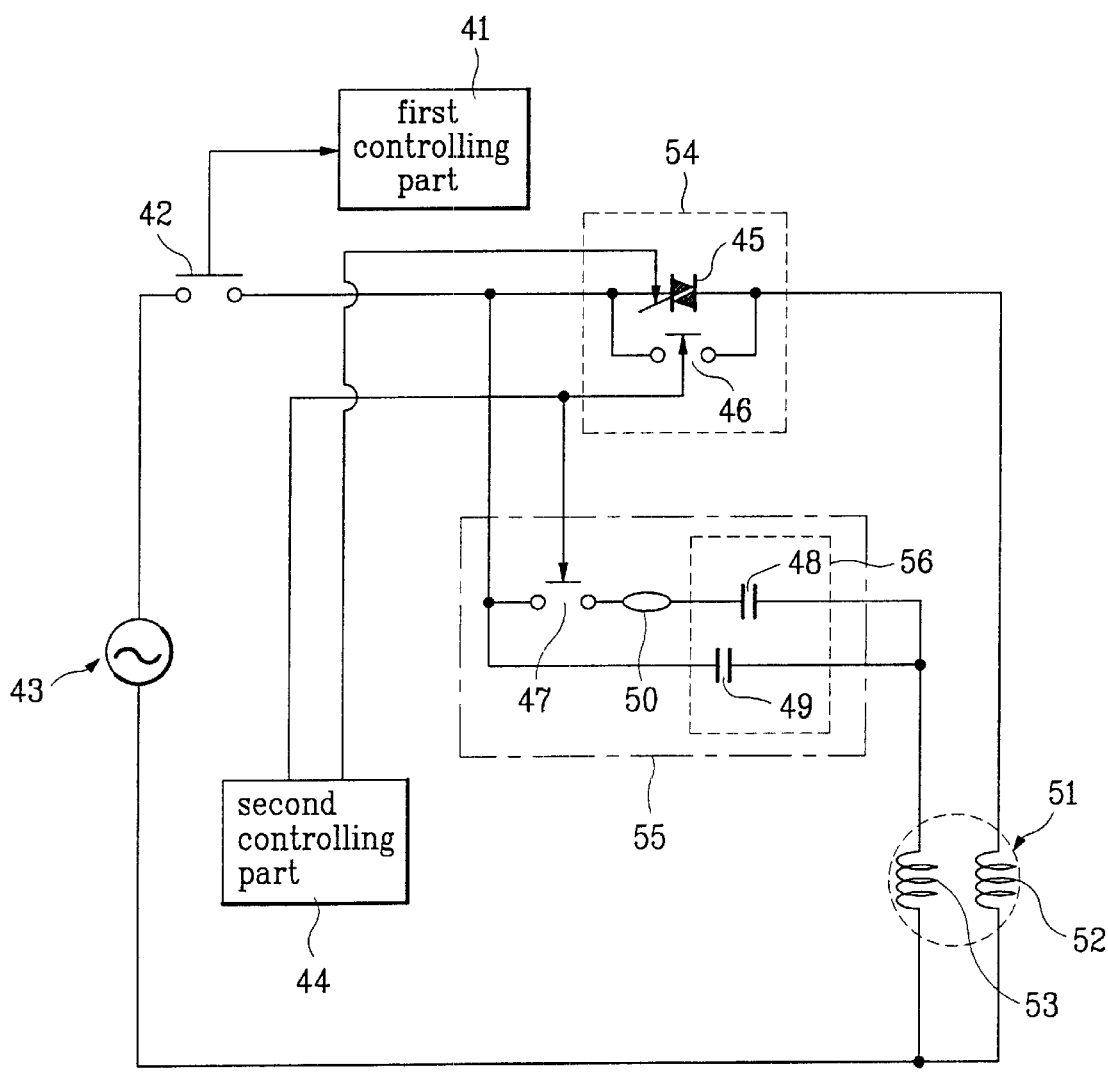
FIG. 6 illustrates a diagram showing a device for controlling supply of current and static capacitance to a compressor in accordance with a second preferred embodiment of the present invention.

FIG. 6 illustrates a diagram showing a device for controlling supply of current and static capacitance to a compressor in accordance with a second preferred embodiment of the present invention.

Referring to FIG. 6, the second embodiment device of the present invention includes a first controlling part 41 for controlling overall operation of the compressor 51, and providing a turning on/off signal for the compressor 51 according to a user's selection, a first switch 42 for supplying a utility power or cutting off the supplying of the utility power from a utility power supply 43 to the compressor in response to the turning on/off signal for the compressor, a second controlling part 44 connected to an output contact point of the first switch 42 for sensing a size and frequency of the utility voltage, and providing a phase control signal of the utility voltage according to the sensed voltage and frequency and a switching control signal different before and after the starting, a current controlling part 54 for limiting the current of the utility power in supplying the current to the main winding 52 of the compressor 51 during starting and releasing the limiting of the current after the starting in response to the switching control signal, and a static capacitance controlling part 55 having a function for preventing a surge current caused by internal momentary discharge for supplying a starting static capacitance and operative static capacitance from a current of the utility power during starting, and only the operative static capacitance to the supplementary winding 53 of the compressor 51 after the starting in response to the switching control signal. As shown in FIG. 5A, the current controlling part 54 shown in FIG. 5A supplies a current to the main winding 52 in a direction the current is increased gradually from an initial starting point to a starting completion point in response to the switching control signal. In FIG. 6, the current controlling part 54 includes a second switch 46 for switching over an output side of the first switch 42 and the main winding 52 in response to the switching control signal, and a triac 45 as a phase controlling part connected in parallel to the second switch 42 between an input contact point and an output contact point thereof for controlling a phase of the current supplied to the main winding 52 depending on the switching on/off of the second switch 46. The static capacitance controlling part 55 includes a third switch 47 for switching on/off between the supplementary winding 53 and the output contact point of the first switch 42 opposite to the second switch 46 in response to the switching control signal, a static capacitance generating part 56 connected between the third switch 49 and the supplementary winding 53 for providing a static capacitance to the supplementary winding 53 required for starting and operating depending on switching on/off of the third switch 47, and a negative temperature coefficient resister 50 connected between an output contact point of the third switch 47 and the static capacitance generating part 56 for preventing a momentary surge current caused by discharge of the static capacitance generating part 56 to the third switch 47. The second switch 46 and the third switch 47 have an overlap time period in which both the second switch 46 and the third switch 47 are in operation. The negative temperature coefficient resister 50 is provided between the third switch 47 and the starting capacitor 48 for preventing the momentary surge current to the third switch 47 caused by discharge between the starting capacitor 48 and the operating capacitor 49 at an initial starting, thereby preventing melting down of the third switch 47.

In FIG. 6, in response to the switching control signal, the second switch 46 connects the output contact point of the first switch 42 and the main winding 52 through the triac 45 in starting, and the second switch 46 connects the output contact point of the first switch 42 and the main winding 52 directly after the starting. The third switch 47 is switched in response to the switching control signal, such that the static capacitance generating part 56 has a great static capacitance in starting and a limited static capacitance after the starting. As explained, the triac is used for controlling a phase of the utility voltage. As shown in FIG. 6, the static capacitance generating part 56 includes an operation capacitor 49 connected between an output contact point of the third switch 47 and the supplementary winding 53 for providing a fixed static capacitance to the supplementary winding 53 in and after starting, and a start supporting capacitor 48 connected between the negative temperature coefficient resister 50 and the supplementary winding 53 in series and with the operation capacitor 49 in parallel for providing a starting static capacitance for boosting a starting torque in starting.

The operation of the second embodiment device for controlling supply of current and static capacitance to a compressor of the present invention will be explained with reference to FIG. 6.

Upon reception of the voltage of the utility power supply(a utility voltage), the second controlling part(a microcomputer) 44 in the control device is initialized, and monitors a state of the utility voltage, i.e., a size and frequency. The second controlling part 44 determines the state of the utility voltage with reference to the sensed voltage and frequency. Then, the second controlling part 44 generates a phase control signal and a switching control signal for providing to the current controlling part 54 and the static capacitance controlling part 55 according to the determined state of the utility voltage. That is, a starting time at which the utility power is provided to the starting capacitor 48 of the static capacitance controlling part 55 is determined, and the switching control signal is generated, and provided to the second switch 46 and the third switch 47. According to the switching control signal, the third switch 47 is turned on and the second switch 46 is turned off. And, the second controlling part 44 provides the phase control signal for controlling the phase of the utility voltage supplied to the main winding 52 of the compressor 51. With the phase control signal, the phase controlling part(or triac) 45 is driven, and the voltage (or current) provided to the main winding 52 is varied. As explained, the phase control signal is a rectangular signal provided to the gate of the triac 45, a duty ratio thereof is fixed based on a state of a sensed utility voltage, and an output time point thereof is fixed based on the frequency of the sensed utility voltage. The supplementary winding 53 of the compressor 51 is required to be provided with a great static capacitance for improving starting characteristics. Accordingly, the operating capacitor 49 and the starting capacitor 48 are connected in parallel by the operation of the third switch 47, to provide a large static capacitance to the supplementary winding 53 during starting. The large static capacitance is the starting static capacitance and the operation static capacitance for the utility voltage.

In the meantime, once the starting is completed, only the operation capacitance from the operating capacitor 49 is provided to the supplementary winding 53 as the third switch 47 is turned off(or opened) during operation of the compressor 51. As explained, the phase control signal and the switching control signal for the compressor 51 are dependent on the state of the utility voltage(size and frequency). That is, if the utility voltage is lower than preset overvoltages, turn on time periods of the triac 45 and the third switch 47 are fixed longer, to make the compressor started well even at a lower voltage. And, if the utility voltage is higher than preset overvoltages, turn on time periods of the triac 45 and the third switch 47 are fixed shorter, for preventing flow of an excessive current to the supplementary winding 52. In the meantime, during a few seconds before the triac 45 is turned on, charges both in the operation capacitor 49 and in the starting capacitor 48 are liable to flow to the supplementary winding 53 in a surge current. In this instance, at the moment the third switch 47 is turned on for using the starting capacitor 48, the surge current may occur owing to a momentary discharge. However, the negative temperature coefficient resister 50 provided between the starting capacitor 48 and the operation capacitor 49 can prevent the melt down of the third switch 47 caused by the surge current. That is, the negative temperature coefficient resister 50 is involved in a decreased resistance when it is heated up according to its characteristics. A changed resistance permits to prevent the third switch 47 from being broken by the surge current. In the meantime, the phase control signal is started to be supplied to the triac 45 in response to a sensed frequency signal. That is, starting from a time point the frequency signal rises from '0'V to '5V', a timer in the second controlling part 44 comes into operation, and the triac 30 comes into operation using the phase control signal of a rectangular form fixed according to the state of the utility voltage as a driving signal. That is, as the phase control signal of the triac 45, a fixed voltage of a limited size is provided to the gate of the triac 45 such that a fixed current of a limited size flows to the main winding 52 during an initial period of starting, a gradually rising voltage is provided to the gate of the triac 45 such that a gradually increasing current flows to the main winding 52 during a middle period of starting, and a voltage of a normal size is provided to the gate of the triac 45 such that a normal current of the utility voltage flows to the main winding 52 during a final period of starting. As explained, if the third switch 47 is turned on and the triac 45 comes into operation, to make the compressor 25 started, the third switch 47 is turned off to leave open after a preset time period, to cut off the current supplied to the supplementary winding 53 through the starting capacitor 48. Accordingly, during operation of the compressor 51, only the operating static capacitance is supplied to the supplementary winding 53 through the operating capacitor 49. When a preset time period is passed after the third switch 47 is turned off, the second switch 46 is turned on, to lead the current of the utility voltage to the main winding 52 through the turned on second switch 46 instead of the triac 45. In this instance, for stable operation of the control device, the triac 45 is kept turned on for a preset time period even after the third switch 47 is turned off and the second switch 46 is turned on. After a preset time point, the current is provided to the main winding 52 only through the turned on second switch 46. Accordingly, the current of this time has not a limited size in the starting, but a normal size of the utility voltage. On the other hand, if the first switch 42 is turned off to leave open in response to a compressor driving turn off signal from the first controlling part 41, as a main controlling part shown in FIG. 6, the utility voltage is supplied to the compressor 51 no more, to stop operation of the compressor 51. As explained, the negative temperature coefficient resister 50 prevents the charge in the operation supporting capacitor 49 from surging into the third switch 47 when the charge is discharged toward the starting capacitor 48 at turning on the third switch 47.

As explained, the second embodiment device for controlling supply of current and static capacitance to a compressor of the present invention has the following advantages.

The negative temperature coefficient resister is provided between the starting capacitor and the operation capacitor, which is involved in a decreased resistance when it is heated. Accordingly, in an initial starting, occurrence of the surge current between the starting capacitor and the operation supporting capacitor is prevented at the moment the triac is turned on, thereby preventing melt down of closely disposed contact points in the switches, or breakage of the starting capacitor.

Third Embodiment

Figure 7:
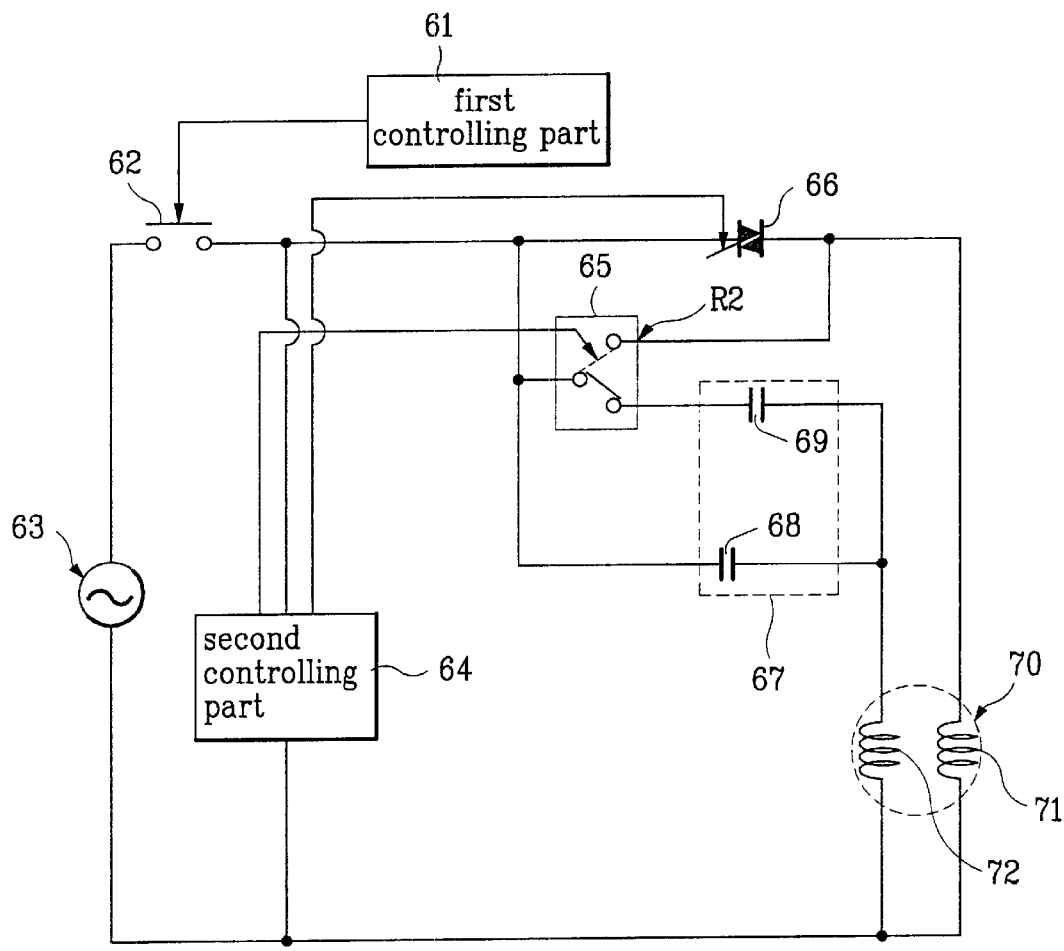
FIG. 7 illustrates a diagram showing a device for controlling supply of current and static capacitance to a compressor in accordance with a third preferred embodiment of the present invention.

FIG. 7 illustrates a diagram showing a device for controlling supply of current and static capacitance to a compressor in accordance with a second preferred embodiment of the present invention.

Referring to FIG. 7, the third embodiment device of the present invention includes a first controlling part 61 for controlling overall operation of the compressor 70, and providing a turning on/off signal for the compressor 70 according to a user's selection, a first switch 62 for supplying a utility power or cutting off the supplying of the utility power from a utility power supply 63 to the compressor 70 in response to the turning on/off signal for the compressor 70, a second controlling part 64 connected to an output contact point of the first switch 62 for sensing a size and frequency of the utility voltage, and providing a phase control signal of the utility voltage according to the sensed voltage and frequency and a switching control signal different before and after the starting, a second switch 65 having one input contact point connected to an output contact point of the first switch 62, a first output contact point and a second output contact point for bring the input contact point into contact with either one of the first and second output contact in response to the switching control signal, a current controlling part 66 having one input terminal connected to an output contact point of the first switch 62 and an output terminal connected to the first output contact point of the second switch 65 for limiting the current of the utility power in supplying the current to the main winding 71 of the compressor 70 during starting and releasing the limiting of the current after the starting depending on an operation state of the second switch 65, and a static capacitance controlling part 67 having a first input terminal connected to an output contact point of the first switch 62, a second input terminal connected to a second output contact point of the second switch 65, and an output terminal connected to the supplementary winding 72 for supplying a starting static capacitance and operative static capacitance from a current of the utility power during starting, and only the operative static capacitance to the starting supplementary winding 72 after the starting depending on an operation state of the second switch 65. As shown in FIG. 7, the current controlling part 66 supplies a current to the main winding 71 in a direction the current is increased gradually between an interval from an initial starting point to a starting completion point in response to the switching control signal. And, the current controlling part 66 includes a phase controlling part having an input terminal connected to an input contact point of the second switch 65 and an output terminal connected to the first output contact point of the second switch 65 in parallel so as to change an internal circuit thereof depending on an operation state of the second switch 65 for controlling a phase of the current of the utility voltage supplied to the main winding 71. The phase controlling part in this third embodiment is a triac. The static capacitance controlling part 67 includes a static capacitance generating part having the first input terminal connected to the input contact point of the second switch 65, the second input terminal connected to the second output contact point of the second switch 65, and the output terminal connected to the supplementary winding 72, so as to change an internal circuit thereof depending on an operation state of the second switch 65 for supplying an appropriate static capacitance to the supplementary winding 72. In this embodiment, the static capacitance generating part includes an operation capacitor 68 connected between the output contact point of the first switch 62 and the supplementary winding 72 for supplying a fixed size of operation static capacitance to the supplementary winding 72 in and after starting, and a starting capacitor 69 connected between the supplementary winding 72 and the second output contact point of the second switch 65 for providing a starting static capacitance to the supplementary winding 72 for boosting a starting torque in starting. The second switch 65 connects the input contact point to the second output contact point in response to the switching control signal in starting, and the input contact point of the first output contact point in response to the switching control signal after the starting.

The operation of the third embodiment device for controlling supply of current and static capacitance to a compressor of the present invention will be explained with reference to FIG. 7.

Upon reception of the voltage of the utility power supply(a utility voltage), the second controlling part(a microcomputer) 64 in the control device is initialized, and monitors a state of the utility voltage, i.e., a size and frequency. The second controlling part 64 determines the state of the utility voltage with reference to the sensed voltage and frequency. Then, the second controlling part 64 generates a phase control signal and a switching control signal for providing to the triac 66, the first current controlling part, and the second switch 65 according to the determined state of the utility voltage. That is, a starting time at which the utility power is provided to the starting capacitor 69 of the static capacitance generating part 67 is determined, and the switching control signal is generated, and provided to the second switch 65. According to the switching control signal, an input contact point of the second switch 65 is connected to the second output contact point for the static capacitance generating part 67. And, the second controlling part 64 provides the phase control signal for controlling the phase of the utility voltage supplied to the main winding 71 of the compressor 70 motor. With the phase control signal, the triac 66, the phase controlling part, is driven, and the current provided to the main winding 71 is varied. As explained, the phase control signal is a rectangular signal provided to the gate of the triac 66, a duty ratio thereof is fixed based on a state of a sensed utility voltage, and an output time point thereof is fixed based on the frequency of the sensed utility voltage. The supplementary winding 72 of the compressor 70 is required to be provided with a great static capacitance for improving starting characteristics of the compressor 70. Accordingly, the operating capacitor 68 and the starting capacitor 69 are connected in parallel by the operation of the second switch 65, to form a starting static capacitance and a operating static capacitance respectively, to provide a large static capacitance to the supplementary winding 72 during starting.

In the meantime, once the starting is completed, only the operation capacitance from the operating capacitor 68 is provided to the supplementary winding 72 as the input contact point of the second switch 65 is connected to the first output contact point during operation of the compressor 51 in response to the switching control signal from the second controlling part 64. As explained, the phase control signal and the switching control signal for the compressor 70 are dependent on the state of the external utility voltage(size and frequency). That is, if the utility voltage is lower than reference voltages, not only turn on time periods of the triac 66, but also a time period of contact between the input contact point of the second switch 65 and the second output contact point are fixed longer, to make the compressor 70 started well even at a lower voltage. And, if the utility voltage is higher than the reference voltages, not only turn on time periods of the triac 66, but also a contact time period between the input contact point of the second switch 65 and the first output contact point are fixed shorter, for preventing flow of an excessive current to the main winding 71. In the meantime, because the input contact point of the second switch 65 is in contact with the second output contact point of the static capacitance generating part 67 at an initial starting of the compressor 70, the current from the output contact point of the first switch 62 is divided to the starting capacitor 69 and the operation capacitor 68, to prevent the charge in the operation capacitor 68 from flowing toward the starting capacitor 69 as a surge current, that in turn prevents melt down of the second switch 65. In the meantime, the phase control signal from the second controlling part 64 is started to be supplied to the triac 66 in response to a sensed frequency signal. That is, starting from a time point the frequency signal rises from '0'V to '5'V, a timer in the second controlling part 64 comes into operation, and the triac 66 comes into operation by using the phase control signal of a rectangular form fixed according to the state of the utility voltage as a driving signal. That is, as the phase control signal of the triac 66, a fixed voltage is provided to the gate of the triac 66 such that a fixed current of a first limited size flows to the main winding 71 during an initial period of starting, a gradually rising voltage is provided to the gate of the triac 66 such that a current gradually increasing from a first size to a second size flows to the main winding 71 during a middle period of starting, and a fixed voltage is provided to the gate of the triac 66 such that a current of a second size flows to the main winding 71 continuously during a final period of starting. In the meantime, if the input contact point of the second switch 65 is connected to the first contact point, the current of the utility voltage flows to the main winding 71 through the first output contact point of the second switch 65 instead of the triac 66. In this instance, for stable operation of the control device, the triac 66 is kept turned on for a preset time period even after the input contact point of the second switch 65 is shifted from the second output contact point to the first output contact point. After the preset time point is passed, the current is only provided to the main winding 71 through the turned on first output contact point of the second switch 65. Accordingly, the current of this time has not a limited size in the starting, but a normal size of the utility voltage. On the other hand, if the first switch 62 is turned off to leave open in response to a compressor driving turn off signal from the first controlling part 61, as a main controlling part shown in FIG. 7, the utility voltage is supplied to the compressor 70 no more, to stop operation of the compressor 70.

As explained, the third embodiment device for controlling supply of current and static capacitance to a compressor of the present invention has the following advantages.

The division of a current to the starting capacitor and the operation capacitor owing to the second switch prevents flow of a surge current toward the second switch, thereby preventing melt down of the contact points of the second switch or breakage of the starting capacitor. And, the use of only one switch in comparison to the first and second embodiments permits the circuit to be simple.

Fourth Embodiment

Figure 8:
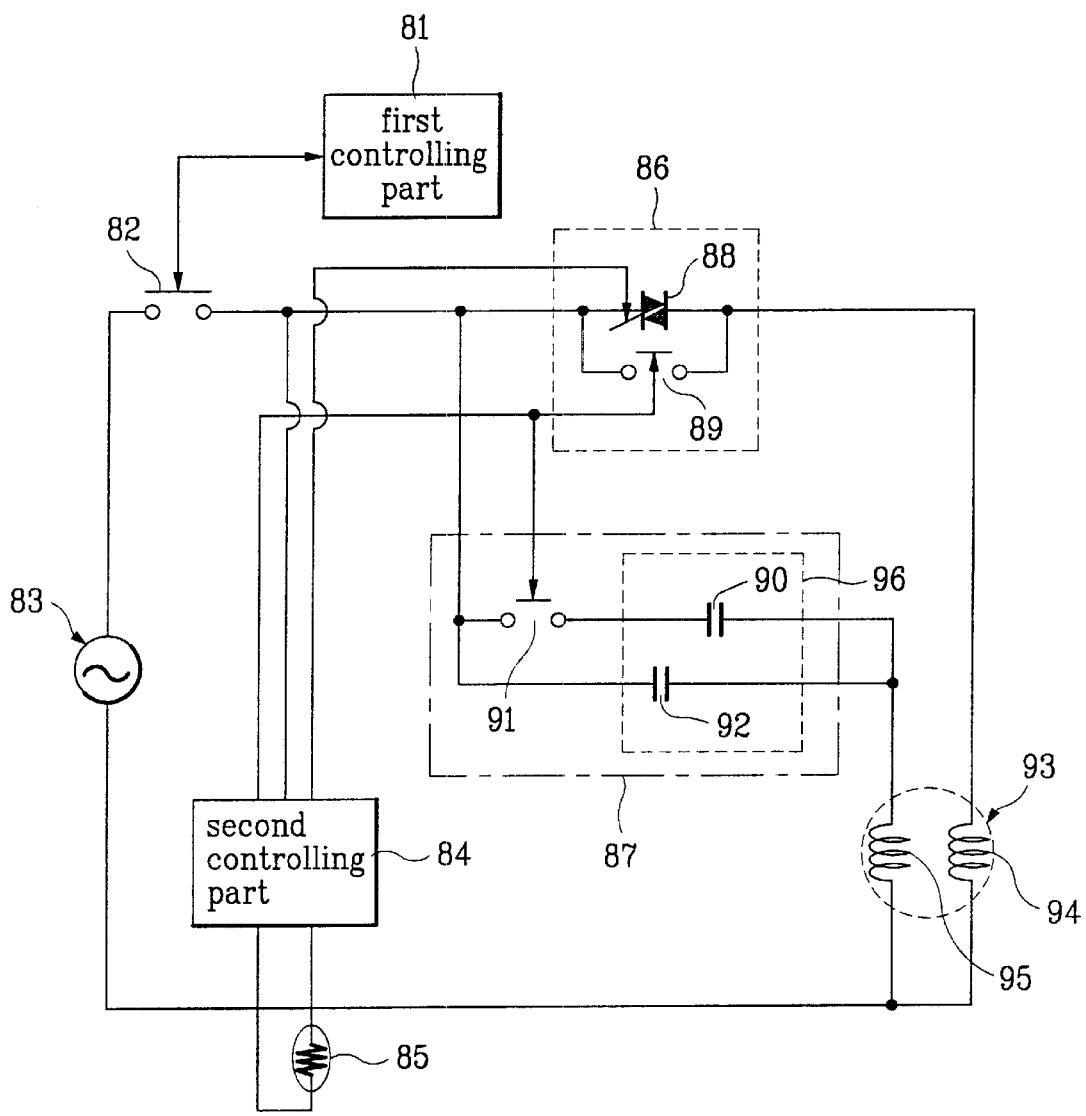
FIG. 8 illustrates a diagram showing a device for controlling supply of current and static capacitance to a compressor in accordance with a fourth preferred embodiment of the present invention.

FIG. 8 illustrates a diagram showing a device for controlling supply of current and static capacitance to a compressor in accordance with a fourth preferred embodiment of the present invention.

Referring to FIG. 8, the device for controlling supply of current and static capacitance to a compressor in accordance with a fourth preferred embodiment of the present invention includes a first controlling part 81 for controlling overall operation of the compressor 93, and providing a driving turn on/off signal for the compressor 93 according to a user's selection, a first switch 82 for supplying the utility voltage received from a utility power supply 83 or cutting off the supplying of the utility power to the compressor 93 in response to the driving turn on/off signal, a temperature sensing part 85 for sensing an external temperature and providing the external temperature, a second controlling part 84 connected to an output contact point of the first switch 82 for sensing a state of the utility voltage, i.e., a size and a frequency thereof, and providing a phase control signal according to the sensed voltage value, the frequency value, and the external temperature value, and a switching control signal different before and after the starting, a current controlling part 86 for limiting the current of the utility power in supplying the current to the main winding 94 of the compressor 93 during starting and releasing the limiting of the current after the starting in response to the switching control signal, and a static capacitance controlling part 87 for supplying a starting static capacitance and operative static capacitance from a current of the utility voltage to the supplementary winding 95 of the compressor 93 during starting, and supplying only the operative static capacitance to the supplementary winding 95 of the compressor 93 after the starting in response to the switching control signal. In FIG. 8, the current controlling part 86 supplies a current to the main winding 94 in a direction the current is increased gradually between an initial starting point to a starting completion point in response to the switching control signal. And, the current controlling part 86 includes a second switch 89 for switching over an output contact point of the first switch 82 and the main winding 94 in response to the switching control signal, and a phase controlling part 88 connected in parallel to the second switch 89 between an input contact point and an output contact point of the second switch 89 for controlling a phase of the current supplied to the main winding 94 depending on switching of the second switch 89. The static capacitance controlling part 87 includes a third switch 91 for switching over the supplementary winding 95 and the output contact point of the first switch 82 opposite to the second switch 89 in response to the switching control signal, and a static capacitance generating part 96 connected between the third switch 91 and the supplementary winding 95 for providing a static capacitance to the supplementary winding 95 required for starting and a time after starting depending on a switching state of the third switch 91.

In the meantime, in response to the switching control signal, the second switch 89 connects the output contact point of the first switch 82 and the main winding 94 through the phase controlling part 88 in starting, and connects the output contact point of the first switch 82 and the main winding 94 directly after the starting. The third switch 91 is switched in response to the switching control signal, such that the static capacitance generating part generates a starting static capacitance and an operation static capacitance of the current of the utility voltage in starting and only the operation static capacitance after the starting. As shown in FIG. 8, the phase controlling part 88 is a triac and will be called as the triac 88 hereafter. The static capacitance generating part 96 includes a starting capacitor 90 connected between an output contact point of the third switch 91 and the supplementary winding 95, and operation capacitor 92 connected between an input contact point of the third switch 91 and the supplementary winding 95 and in parallel to the starting capacitor 90.

The operation of the fourth embodiment device for controlling supply of current and static capacitance to a compressor of the present invention will be explained with reference to FIG. 8.

Upon reception of the voltage of the utility power supply 83(a utility voltage), the second controlling part(a microcomputer) 84 in the control device is initialized, and determines a state of the utility voltage, i.e., a voltage and a frequency thereof. And, the temperature sensing part 85 senses an external temperature of the compressor 93, and provides to the second controlling part 84. Then, the second controlling part 84 generates a phase control signal and a switching control signal for providing to the current controlling part 86 and the static capacitance controlling part 87 according to the determined state of the utility voltage and the external temperature. A starting time is determined, at which the utility power is provided to the starting capacitor 90 of the static capacitance controlling part 87, and the switching control signal is generated, and provided to the second switch 89 and the third switch 91. According to the switching control signal, the third switch 91 is turned on and the second switch 89 is turned off. That is, the second switch 89 and the third switch 91 are operative oppositely in response to the switching control signal. And, for controlling the phase of the current of the utility voltage supplied to the main winding 94 of the compressor 93, the second controlling part 84 provides the phase control signal, which may vary with the temperature value received from the temperature sensing part 85. That is, the second controlling part 84 compares the external temperature measured presently and a preset reference temperature, to find a season pertinent to the present external temperature and provide phase control signals consistent to the season. The phase control signal is provided to a gate of the triac 88 in forms of pulses. For example, in a case the external temperature is higher than T1 set as a reference temperature for summer, a pulse width of the phase control signal provided to the triac 88 is set to P3 of summer, in a case the external temperature is below T3 set as a reference temperature for winter, a pulse width of the phase control signal is set to P1 of winter, and, if the external temperature is T2 between T1 and T3 set as a reference temperature for spring and fall, a pulse width of the phase control signal is set to P2 of spring and fall. For reference, in starting the compressor 93, the pulse width of the phase control signal is required to be large if the external temperature is low because the low external temperature leads a viscosity of the refrigerant poor to restrict a compressor motor substantially. Therefore, P1 has the largest pulse width, P2 has a next large pulse width, and P3 has the smallest pulse width. According to the phase control signal set with respective to a season, the triac 88 is driven, and a current provided to the main winding 94 is varied. As explained, the phase control signal is a rectangular signal provided to the gate of the triac 88, a duty ratio thereof is fixed, not only based on the external temperature, but also based on a size of the utility voltage sensed already, and an output time point thereof is fixed based on the frequency value of the utility voltage. The supplementary winding 95 of the compressor 93 is required to be provided with a great static capacitance for improving starting characteristics. Accordingly, the operating capacitor 92 and the starting capacitor 90 are connected in parallel by the operation of the third switch 91, to provide the starting static capacitance and the operation static capacitance to the supplementary winding 95 during starting.

In the meantime, once the starting is completed, only the operation capacitance from the operating capacitor 92 is provided to the supplementary winding 95 as the third switch 91 is turned off(or opened) during operation of the compressor 95. As explained, the phase control signal and the switching control signal for the compressor 95 are dependent on the state of the utility voltage. That is, if the utility voltage is lower than reference voltages, turn on time periods of the triac 88 and the third switch 91 are set longer, to make the compressor 93 started well even at a lower voltage. Opposite to this, if the utility voltage is higher than the reference voltages, turn on time periods of the triac 88 and the third switch 91 are set shorter, for preventing flow of an excessive current to the main winding 94. For preventing flow of an excessive current to the main winding 94 in starting the compressor 93, as the phase control signal provided to the triac 88, a fixed voltage is provided to the gate of the triac 88 such that a fixed current of a first limited size flows to the main winding 94 during an initial period of starting, a gradually rising voltage is provided to the gate of the triac 88 such that a current gradually increasing from a first size to a second size flows to the main winding 94 during a middle period of starting, and a fixed voltage is provided to the gate of the triac 66 such that a current of a second size flows to the main winding 94 continuously during a final period of starting. As explained, if the third switch 91 is turned on and the triac 88 comes into operation, to start the compressor 93, the third switch 91 is turned off to leave open, to cut off the static capacitance supplied to the supplementary winding 95 through the starting capacitor 90. Accordingly, during operation of the compressor 93, the operating static capacitance is supplied to the supplementary winding 95 only through the operating capacitor 92. When a preset time period is passed after the third switch 91 is turned off, the second switch 89 is turned on, to lead the current of the utility power to the main winding 94 through the turned on second switch 89 instead of the triac 88. In this instance, for stable operation of the control device, the triac 88 is kept turned on for a preset time period even after the third switch 91 is turned off and the second switch 89 is turned on. Thereafter, the current is provided to the main winding 94 only through the turned on second switch 89. Accordingly, the current of this time is not limited like in the starting, but normal of the utility voltage. On the other hand, if the first switch 82 is turned off to leave open in response to a compressor driving control signal from the first controlling part 81, as a main controlling part, the utility voltage is supplied to the compressor 93 no more, to stop operation of the compressor 93.

As explained, the fourth embodiment device of the present invention can optimize starting of the compressor as the phase control signal provided to the triac is varied with seasons, appropriately.

FIFTH EMBODIMENT

Figure 9:
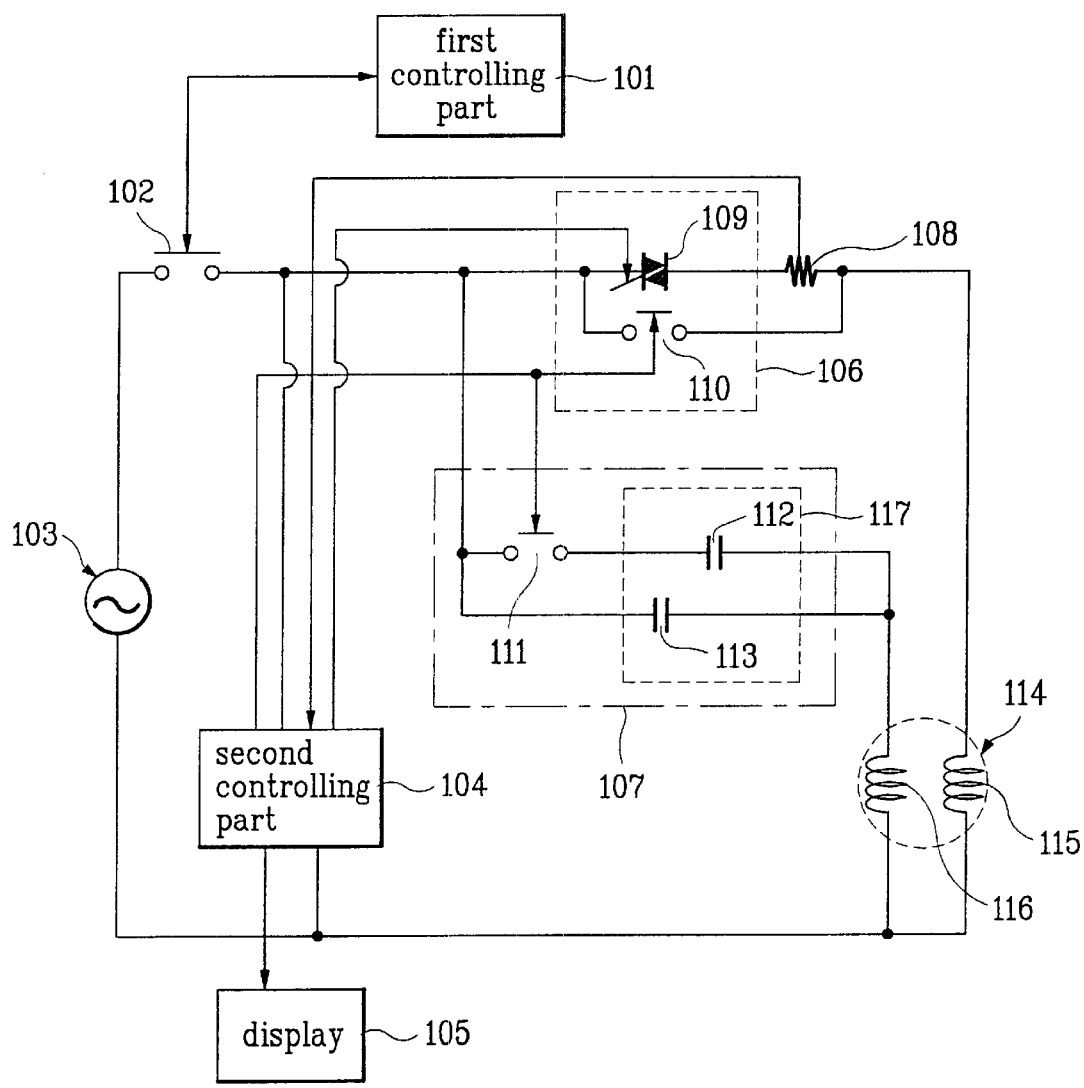
FIG. 9 illustrates a diagram showing a device for controlling supply of current and static capacitance to a compressor in accordance with a fifth preferred embodiment of the present invention.

FIG. 9 illustrates a diagram showing a device for controlling supply of current and static capacitance to a compressor in accordance with a fifth preferred embodiment of the present invention.

Referring to FIG. 9, the device for controlling supply of current and static capacitance to a compressor in accordance with a fifth preferred embodiment of the present invention includes a first controlling part 101 for controlling overall operation of the compressor 114, and providing a driving turn on/off signal for the compressor 114 according to a user's selection, a first switch 102 for supplying the utility voltage received from a utility power supply 103 or cutting off the supplying of the utility power to the compressor 114 in response to the driving turn on/off signal, a second controlling part 104 connected to an output contact point of the first switch 102 for sensing a state of the utility voltage, i.e., a size and a frequency thereof, and providing a phase control signal and a switching control signal according to the sensed voltage value and the frequency value, and a display signal according to the current flowing to the main winding 115 of the compressor 114, a current controlling part 106 for changing an internal circuit in response to the switching control signal and the phase control signal, and limiting the current of the utility voltage in supplying the current to the main winding of the compressor 114 during starting and releasing the limiting of the current after the starting, a current detecting part 108 connected to an output side of the current controlling part 106 for detecting a current to the main winding 115 of the compressor 1124 and providing to the second controlling part, a display part 105 for displaying the state of the current to the main winding in response to the display signal, and a static capacitance controlling part 107 having a function for preventing a surge current caused by an internal momentary discharge for supplying a starting static capacitance and operative static capacitance from a current of the utility voltage to the starting supplementary winding 116 of the compressor 114 during starting, and supplying only the operative static capacitance to the starting supplementary winding 116 of the compressor 114 after the starting by changing an internal circuit in response to the switching control signal. In FIG. 9, the current detecting part 108 may be a resistor connected between the current controlling part 106 and the main winding 115, and the display part 105 may be an LED(Light Emitting Diode). Hereafter, the display part will be an LED 105. In FIG. 9, the LED 105 flashes if the current to the main winding 115 detected in response to the display signal is greater than a preset first overcurrent, turns on if the current is smaller than the first overcurrent and greater than a preset second overcurrent(the first overcurrent>the second overcurrent), turns off if the current is smaller than the second overcurrent. However, the display method may be replaced with another display method. In FIG. 9, the current controlling part 106 supplies a current to the main winding 115 in a direction the current is increased gradually between an initial starting point to a starting completion point in response to the switching control signal and the phase control signal. And, the current controlling part 106 includes a second switch 110 for switching over an output contact point of the first switch 102 and the main winding 115 in response to the switching control signal, and a phase controlling part 109 connected in parallel to the second switch 110 between an input contact point and an output contact point of the second switch 110 for controlling a phase of the current supplied to the main winding 115 depending on switching of the second switch 110. The static capacitance controlling part 107 includes a third switch 111 for switching over the supplementary winding 95 and the output contact point of the first switch 102 opposite to the second switch 110 in response to the switching control signal, and a static capacitance generating part 117 connected between the third switch 111 and the supplementary winding 116 for providing a required static capacitance to the supplementary winding 116 depending on a switching state of the third switch 111. In the current controlling part 106, in response to the switching control signal, the second switch 110 connects the output contact point of the first switch 102 and the main winding 115 through the phase controlling part 109 in starting, and connects the output contact point of the first switch 102 and the main winding 115 directly after the starting without passing through the phase controlling part 109. The third switch 111 is switched in response to the switching control signal, such that the static capacitance generating part 117 generates a starting static capacitance and an operation static capacitance of the current of the utility voltage in starting and only the operation static capacitance after the starting. The phase controlling part 109 is a triac and will be called as the triac 109 hereafter. The static capacitance generating part 117 in the static capacitance controlling part 107 includes a starting capacitor 112 connected between an output contact point of the third switch 111 and the supplementary winding 116 for providing a starting static capacitance required for a starting torque to the supplementary winding 116 in starting, and operation capacitor 113 connected between the third switch 111 and the supplementary winding 116 in series and in parallel to the starting capacitor 112 for providing an operating static capacitance in starting and after the starting.

The operation of the fifth embodiment device for controlling supply of current and static capacitance to a compressor of the present invention will be explained with reference to FIG. 9.

Upon reception of the voltage of the utility power supply 103(a utility voltage), the second controlling part(a microcomputer) 104 in the control device is initialized, and determines a state of the utility voltage, i.e., a voltage and a frequency thereof. And, the current detecting part 108 detects a current flowing to the main winding 115 of the compressor 114 presently, and provides to the second controlling part 104. Then, the second controlling part 104 generates a phase control signal and a switching control signal for providing to the current controlling part 106 and the static capacitance controlling part 107 according to the determined state of the utility voltage and the current to the main winding. That is, a starting time is determined, at which the utility power is provided to the starting capacitor 112 of the static capacitance controlling part 107, and the switching control signal is generated, and provided to the second switch 110 and the third switch 111. According to the switching control signal, the third switch 111 is turned on and the second switch 110 is turned off. That is, the second switch 110 and the third switch 111 are operative oppositely in response to the switching control signal. In this instance, the second switch 110 and the third switch 111 have an overlap time period in which the second switch 110 and the third switch 111 are in operation on the same time. And, the second controlling part 104 provides the display signal for informing a state of the present current to the main winding 115 of the compressor 114. As explained, the display signal may vary with a current value flowing to the main winding 115, presently. That is, the second controlling part 104 compares the measured present current value to the main winding 115 and a preset reference overcurrent, to find a state of the present current value and provide a phase control signal consistent to the state. For example, in a case the current to the main winding 115 is greater than the preset first overcurrent, the LED 105 is made to flash to give alarm to the user, if the detected current is lower than the preset first overcurrent and greater than a preset second overcurrent, the LED 105 is turned on so that the user can make a service call, and in a case the detected current to the main winding 115 is lower than the preset second overcurrent, the second controlling part 104, assuming that it as a regular state, turns off the LED. This display method may be replaced with other method. As explained in other embodiments already, the phase control signal is a rectangular signal provided to the gate of the triac 109, a duty ratio thereof is fixed based on a size of the utility voltage sensed already, and an output time point of the pulse is fixed based on the frequency value of the utility voltage sensed already. The supplementary winding 116 of the compressor 114 is required to be provided with a great static capacitance for improving starting characteristics. Accordingly, the operating capacitor 113 and the starting capacitor 112 are connected in parallel by the operation of the third switch 111, to provide the starting static capacitance and the operation static capacitance to the supplementary winding 116 during starting.

In the meantime, once the starting is completed, only the operation capacitance from the operation supporting capacitor 113 is provided to the supplementary winding 116 as the third switch 111 is turned off(or opened) during operation of the compressor 114. As explained, the phase control signal and the switching control signal for the compressor 114 are dependent on the state of the utility voltage. That is, if the utility voltage is lower than reference voltages, turn on time periods of the triac 109 and the third switch 111 are set longer, to make the compressor 114 started well even at a lower voltage. Opposite to this, if the utility voltage is higher than the reference voltages, turn on time periods of the triac 109 and the third switch 111 are set shorter, for preventing flow of an excessive current to the main winding 115. For preventing flow of an excessive current to the main winding 115 in starting the compressor 114, as the phase control signal provided to the triac 109, a fixed voltage is provided to the gate of the triac 109 such that a fixed current of a first limited size flows to the main winding 115 during an initial period of starting, a gradually rising voltage is provided to the gate of the triac 109 such that a current gradually increasing from a first size to a second size flows to the main winding 115 during a middle period of starting, and a fixed voltage is provided to the gate of the triac 66 such that a current of a second size flows to the main winding 115 continuously during a final period of starting. As explained, if the third switch 111 is turned on and the triac 109 comes into operation, to start the compressor 114, the third switch 111 is turned off to leave open, to cut off the static capacitance supplied to the supplementary winding 116 through the starting capacitor 112. Accordingly, during operation of the compressor 114, the operating static capacitance is supplied to the supplementary winding 116 only through the operating capacitor 113. On the other hand, if the first switch 102 is turned off to leave open in response to a compressor driving control signal from the first controlling part 114, as a main controlling part, the current of the utility voltage is supplied to the compressor 114 no more, and operation of the compressor 114 is stopped.

As explained, the fifth embodiment device of the present invention permits to sense a current to the main winding always, and as a state of the sensed state is displayed to outside of the control device, the user to sense an overcurrent to the main winding.

Sixth Embodiment

Figure 10:
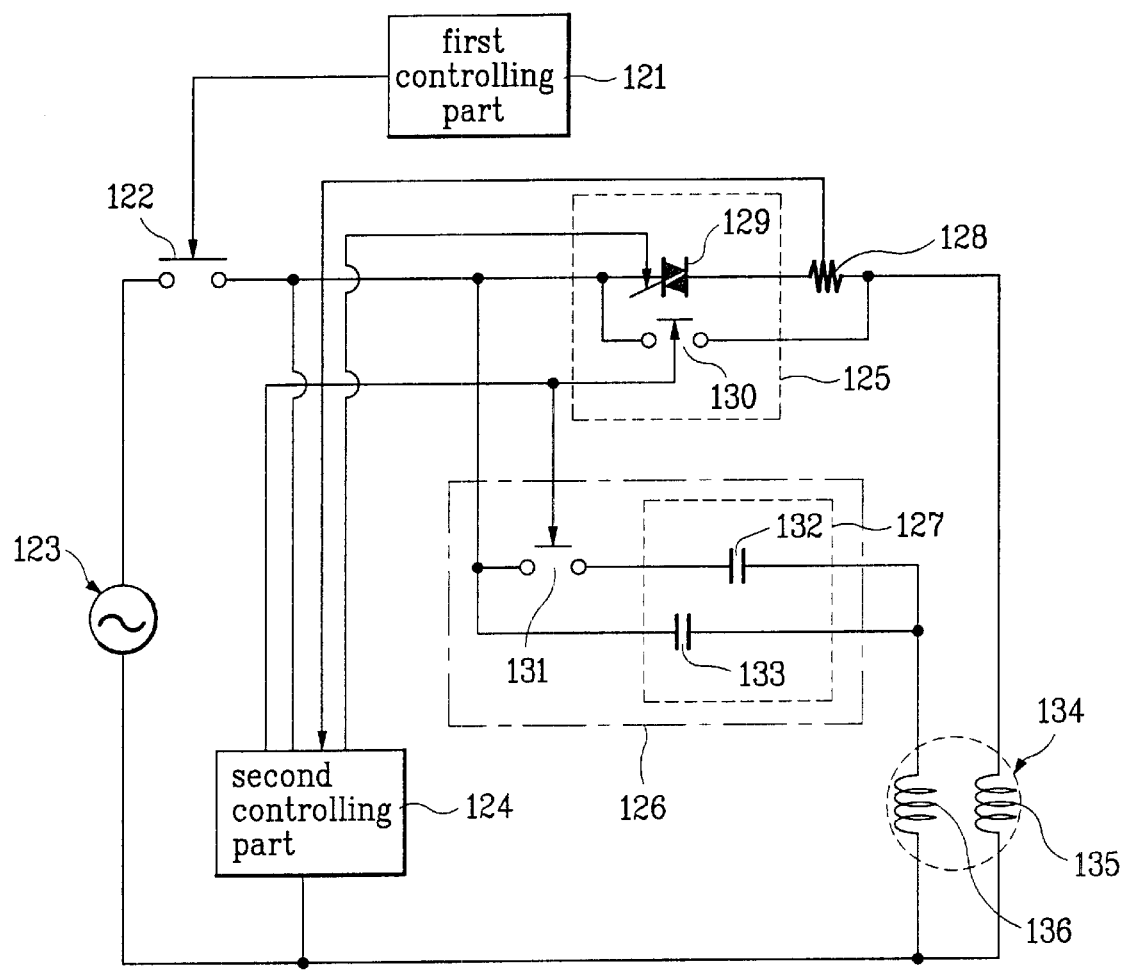
FIG. 10 illustrates a diagram showing a device for controlling supply of current and static capacitance to a compressor in accordance with a sixth preferred embodiment of the present invention.

FIG. 10 illustrates a diagram showing a device for controlling supply of current and static capacitance to a compressor in accordance with a sixth preferred embodiment of the present invention.

Referring to FIG. 10, the device for controlling supply of current and static capacitance to a compressor in accordance with a sixth preferred embodiment of the present invention includes a first controlling part 121 for controlling overall operation of the compressor 134, and providing a driving turn on/off signal for the compressor 134 according to a user's selection, a first switch 122 for supplying the utility voltage received from a utility power supply 123 or cutting offset supplying of the utility power to the compressor 134 in response to the driving turn on/off signal, a second controlling part 124 connected to an output contact point of the first switch 122 for sensing a state of the utility voltage, i.e., a size and a frequency thereof, and providing a phase control signal and a switching control signal according to the sensed voltage value, the frequency value and a current value to the main winding 135 of the compressor 134, a current controlling part 125 for changing an internal circuit in response to the switching control signal and the phase control signal, and limiting the current of the utility voltage in supplying the current to the main winding 135 of the compressor 134 during starting and releasing the limiting of the current after the starting, a current detecting part 128 connected to an output side of the current controlling part 125 for detecting a current to the main winding 135 of the compressor 134 and providing to the second controlling part 124, and a static capacitance controlling part 126 for supplying a starting static capacitance and operative static capacitance from a current of the utility voltage to the starting supplementary winding 136 of the compressor 134 during starting, and supplying only the operative static capacitance to the starting supplementary winding 136 of the compressor 134 after the starting by changing an internal circuit in response to the switching control signal. In FIG. 10, the current detecting part 128 may be a resistor connected between the current controlling part 125 and the main winding 135. In FIG. 10, the current controlling part 125 supplies a current to the main winding 135 in a direction the current is increased gradually between an initial starting point to a starting completion point in response to the switching control signal and the phase control signal. And, the current controlling part 125 includes a second switch 130 having an input contact point connected to the first switch 122 and an output contact point connected to the main winding 135 for switching over an output contact point of the first switch 122 and the main winding 135 in response to the switching control signal, and a phase controlling part 129 having an input terminal connected to an input contact point of the second switch 130 and an output terminal connected to an input terminal of the current detecting part 128 for controlling the current supplied to the main winding 135 depending on switching of the second switch 130 and the phase control signal. The static capacitance controlling part 126 includes a third switch 131 for switching over the supplementary winding 136 and the output contact point of the first switch 122 opposite to the second switch 130 in response to the switching control signal, and a static capacitance generating part 127 connected between the third switch 131 and the supplementary winding 136 for providing a static capacitance to the supplementary winding 136 required for starting and a time period after starting depending on a switching state of the third switch 131. In response to the switching control signal, the second switch 130 connects the output contact point of the first switch 122 and the main winding 135 through the phase controlling part 129 in starting, and connects the output contact point of the first switch 122 and the main winding 135 directly after the starting without passing through the phase controlling part

129. The third switch 131 is switched in response to the switching control signal, such that the static capacitance generating part 127 generates a great starting static capacitance in starting and a limited static capacitance after the starting. In the current controlling part 125, the phase controlling part 129 is a triac operative in response to the phase control signal from the second controlling part 124, and will be called as the triac 129 hereafter. The triac 129 will be turned on for a longer time period in response to a varied phase control signal if the utility voltage is lower than a reference utility voltage, and turned on for a shorter time period in response to the varied phase control signal if the utility voltage is higher than the reference utility voltage(for example, 110V or 220V). The static capacitance generating part 127 includes a starting capacitor 132 connected between an output contact point of the third switch 131 and the supplementary winding 136 for providing a starting static capacitance required for a starting torque to the supplementary winding 136 in starting, and operation capacitor 133 connected between the third switch 131 and the supplementary winding 136 in series and in parallel to the starting capacitor 132 for providing an operating static capacitance in starting and after the starting.

The operation of the sixth embodiment device for controlling supply of current and static capacitance to a compressor of the present invention will be explained with reference to FIG. 10.

Upon reception of the voltage of the utility power supply 123(a utility voltage), the second controlling part(a microcomputer) 124 in the control device is initialized, and determines a state of the utility voltage, i.e., a voltage and a frequency thereof. And, the current detecting part 128 detects a current flowing to the main winding 135 of the compressor 134 presently, and provides to the second controlling part 124. Then, the second controlling part 124 generates a phase control signal and a switching control signal for providing to the current controlling part 125 and the static capacitance controlling part 126 according to the determined state of the utility voltage and the current to the main winding. That is, a starting time is determined, at which the utility power is provided to the starting capacitor 132 of the static capacitance controlling part 126, and the switching control signal is generated, and provided to the second switch 130 and the third switch 131. According to the switching control signal, the third switch 131 is turned on and the second switch 130 is turned off. That is, the second switch 130 and the third switch 131 are operative oppositely in response to the switching control signal. And, the second controlling part 124 provides a starting voltage value at the main winding 135 by multiplying the present current value to the main winding 135 of the compressor 134 and a resistance of the current detecting part 128(hereafter called as a resistor 128). The phase control signal may vary with the measured current to the main winding 135 presently, i.e., the starting voltage value. That is, the second controlling part 124 compares the measured present starting voltage value to a preset overvalues, to find a state of the present current value to the main winding 135 and vary the phase control signal consistent to the state. For example, in a case the current to the main winding 135 is greater than the preset first overcurrent, the second controlling part 124 informs the fact to the first controlling part 121 so that the first controlling part 121 knows that the compressor 134 is in a critical state. Then, the first controlling part 121 applies a driving turn off signal to the first switch 122, to turn off, to open the first switch 122. Accordingly, the utility voltage will be supplied to the compressor no more, and the compressor 134 stops the operation. In a case the detected current to the main winding 135 is lower than the preset first overcurrent and greater than the preset second overcurrent, assuming that an overcurrent flows to the main winding 135, the second controlling part 124 reduces a width of the phase control signal applied to the gate of the triac 129 in a form of pulse. And, in a case the detected current to the main winding 135 is lower than the preset second overcurrent, assuming that it as a regular state, the second controlling part 124 maintains an initial phase control value as it is and provides to the triac 129. This phase control signal varying method may be replaced with other method. As explained in other embodiments already, the phase control signal is a rectangular signal provided to the gate of the triac 129, a duty ratio thereof is fixed based on a size of the utility voltage sensed already, and an output time point of the pulse is fixed based on the frequency value of the utility voltage sensed already. The supplementary winding 136 of the compressor 134 is required to be provided with a great static capacitance for improving starting characteristics. Accordingly, the operating capacitor 133 and the starting capacitor 132 are connected in parallel by the operation of the third switch 131, to provide the starting static capacitance and the operation static capacitance to the supplementary winding 136 during starting.

In the meantime, once the starting is completed, only the operation capacitance from the operation supporting capacitor 133 is provided to the supplementary winding 136 as the third switch 131 is turned off(or opened) during operation of the compressor 134. As explained, the phase control signal and the switching control signal for the compressor 134 are dependent on the state of the utility voltage in an initial stage of operation of the compressor 134. That is, if the utility voltage is lower than reference voltages, turn on time periods of the triac 129 and the third switch 131 are set longer, to make the compressor 134 started well even at a lower voltage. Opposite to this, if the utility voltage is higher than the reference voltages, turn on time periods of the triac 129 and the third switch 131 are set shorter, for preventing flow of an excessive current to the main winding 135. For preventing flow of an excessive current to the main winding 135 in starting the compressor 134, as the phase control signal provided to the triac 129, a fixed voltage is provided to the gate of the triac 129 such that a fixed current of a first limited, fixed size flows to the main winding 135 during an initial period of starting, a gradually rising voltage is provided to the gate of the triac 129 such that a current gradually increasing from a first size to a second size flows to the main winding 135 during a middle period of starting, and a fixed voltage is provided to the gate of the triac 66 such that a current of a second size flows to the main winding 135 continuously during a final period of starting. As explained, if the third switch 131 is turned on and the triac 129 comes into operation, to start the compressor 134, the third switch 131 is turned off to leave open, to cut off the current supplied to the supplementary winding 136 through the starting capacitor 132. Accordingly, during operation of the compressor 134 after starting, the current is supplied to the supplementary winding 136 only through the operating capacitor 133. On the other hand, if the first switch 122 is turned off to leave open in response to a compressor driving control signal from the first controlling part 121, as a main controlling part, the utility voltage is supplied to the compressor 134 no more, to stop operation of the compressor 134.

As explained, the sixth embodiment device of the present invention permits to adjust an excessive starting voltage by detecting the starting voltage supplied to the compressor through the current detecting part, and stopping operation of the compressor or changing the phase control signal if it is assumed that the detected starting voltage exceeds a regular size.

Seventh Embodiment

Figure 11:
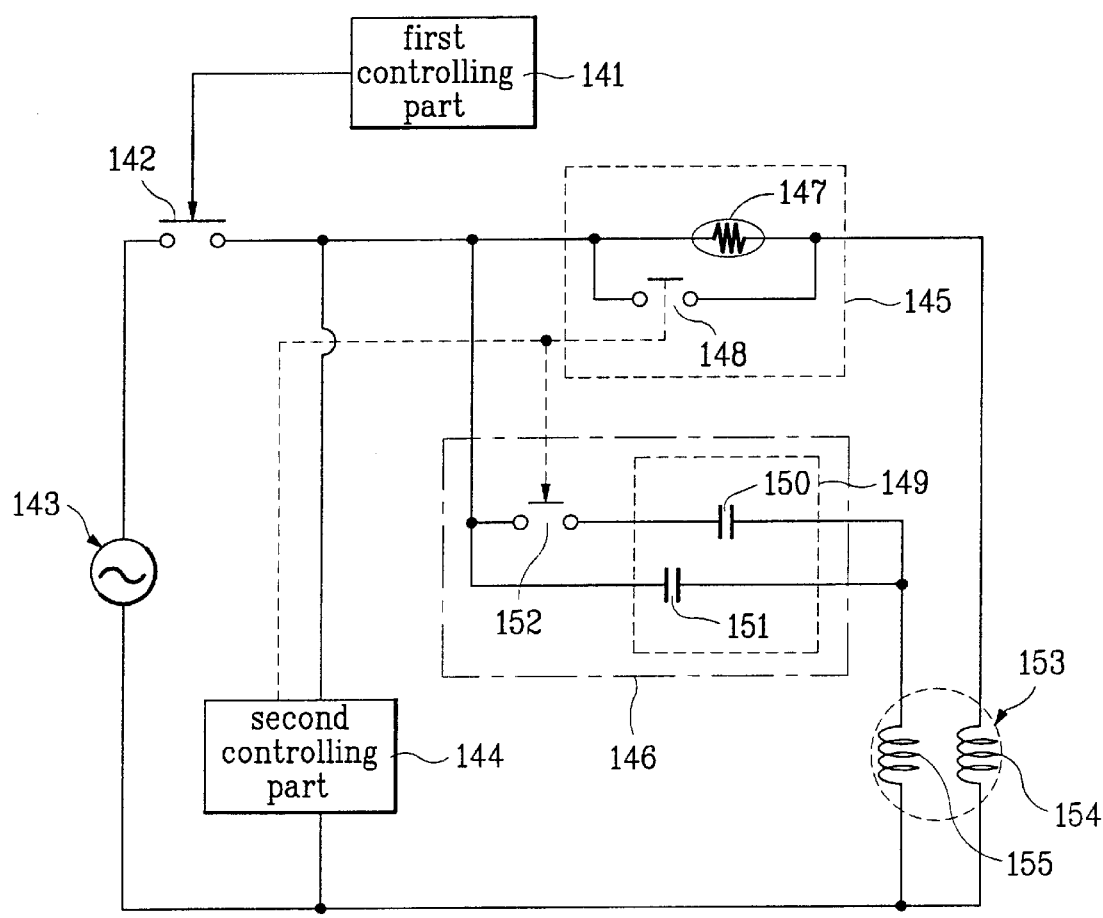
FIG. 11 illustrates a diagram showing a device for controlling supply of current and static capacitance to a compressor in accordance with a seventh preferred embodiment of the present invention; and, FIG. 12 illustrates a graph showing resistance characteristics of a negative temperature coefficient resister.

FIG. 11 illustrates a diagram showing a device for controlling supply of current and static capacitance to a compressor in accordance with a seventh preferred embodiment of the present invention.

Referring to FIG. 11, the device for controlling supply of current and static capacitance to a compressor in accordance with a seventh preferred embodiment of the present invention includes a first controlling part 141 for controlling overall operation of the compressor 153, and providing a driving turn on/off signal for the compressor 153 according to a user's selection, a first switch 142 for supplying the utility voltage received from a utility power supply 143 or cutting offset supplying of the utility power to the compressor 153 in response to the driving turn on/off signal, a second controlling part 144 connected to an output contact point of the first switch 142 for sensing a state of the utility voltage, i.e., a size and a frequency thereof, and providing a switching control signal according to the sensed voltage value, and the frequency value, a current controlling part 145 having a resistance reversely proportional to a temperature thereof for changing an internal circuit in response to the switching control signal suitable for starting and a time period after the starting to limit the current of the utility voltage in supplying the current to the main winding 154 of the compressor 153 in starting and releasing the limiting of the current after the starting, and a static capacitance controlling part 146 for supplying a starting static capacitance and operative static capacitance from a current of the utility voltage to the starting supplementary winding of the compressor during starting, and supplying only the operative static capacitance to the starting supplementary winding of the compressor after the starting by changing an internal circuit in response to the switching control signal. The current controlling part 145 supplies a current to the main winding 154 in a direction the current is increased gradually between an initial starting point to a starting completion point in response to the switching control signal and the phase control signal by using a resistance reversely proportional to a temperature. And, the current controlling part 145 includes a second switch 148 having an input contact point connected to the first switch 142 and an output contact point connected to the main winding 154 for switching over an output contact point of the first switch 142 and the main winding 154 in response to the switching control signal, and a negative temperature coefficient resister connected between an output contact point of the first switch 148 and the main winding 154 in series and connected to the second switch 148 in parallel between them for limiting a current to the main winding 154 in starting. The static capacitance controlling part 146 includes a third switch 152 for switching over the supplementary winding 155 and the output contact point of the first switch 142 opposite to the second switch 148 in response to the switching control signal, and a static capacitance generating part 149 connected between the third switch 152 and the supplementary winding 155 for providing a static capacitance to the supplementary winding 155 required for starting and a time period after starting depending on a switching state of the third switch 152. In response to the switching control signal, the second switch 148 in the current controlling part 145 connects the output contact point of the first switch 142 and the main winding 154 through the negative temperature coefficient resister 147 in starting, and connects the output contact point of the first switch 142 and the main winding 154 directly after the starting without passing through the negative temperature coefficient resister 147. The third switch 152 in the static capacitance controlling part 146 is switched in response to the switching control signal, such that the static capacitance generating part 149 generates a starting static capacitance and a operating static capacitance in starting and only the operating static capacitance after the starting by changing an internal circuit of the third switch 152. The static capacitance generating part 149 in the second current controlling part 146 includes a starting capacitor 150 connected between an output contact point of the third switch 152 and the supplementary winding 155 for providing a starting static capacitance required for a starting torque to the supplementary winding 155 in starting, and an operation capacitor 151 connected between the third switch 152 and the supplementary winding 155 in series and in parallel to the starting capacitor 150 for providing an operating static capacitance in starting and after the starting.

The operation of the seventh embodiment device for controlling supply of current and static capacitance to a compressor of the present invention will be explained with reference to FIG. 11.

Upon reception of the voltage of the utility power supply 143(a utility voltage), the second controlling part(a microcomputer) 144 in the control device is initialized, and determines a state of the utility voltage, i.e., a voltage and a frequency thereof. Then, the second controlling part 144 generates a switching control signal for providing to the current controlling part 145 and the static capacitance controlling part 146 according to the determined state of the utility voltage. That is, a starting time is determined, at which the utility power is provided to the starting capacitor 150 of the static capacitance controlling part 146, and the switching control signal is generated, and provided to the second switch 148 and the third switch 152. According to the switching control signal, the third switch 152 is turned on and the second switch 148 is turned off. That is, the second switch 148 and the third switch 152 are operative oppositely in response to the switching control signal. The supplementary winding 155 of the compressor 153 is required to be provided with a great static capacitance for improving starting characteristics. Accordingly, the operating capacitor 151 and the starting capacitor 150 are connected in parallel by the operation of the third switch 152, to provide the starting static capacitance and the operation static capacitance to the supplementary winding 155 during starting.

Figure 12:
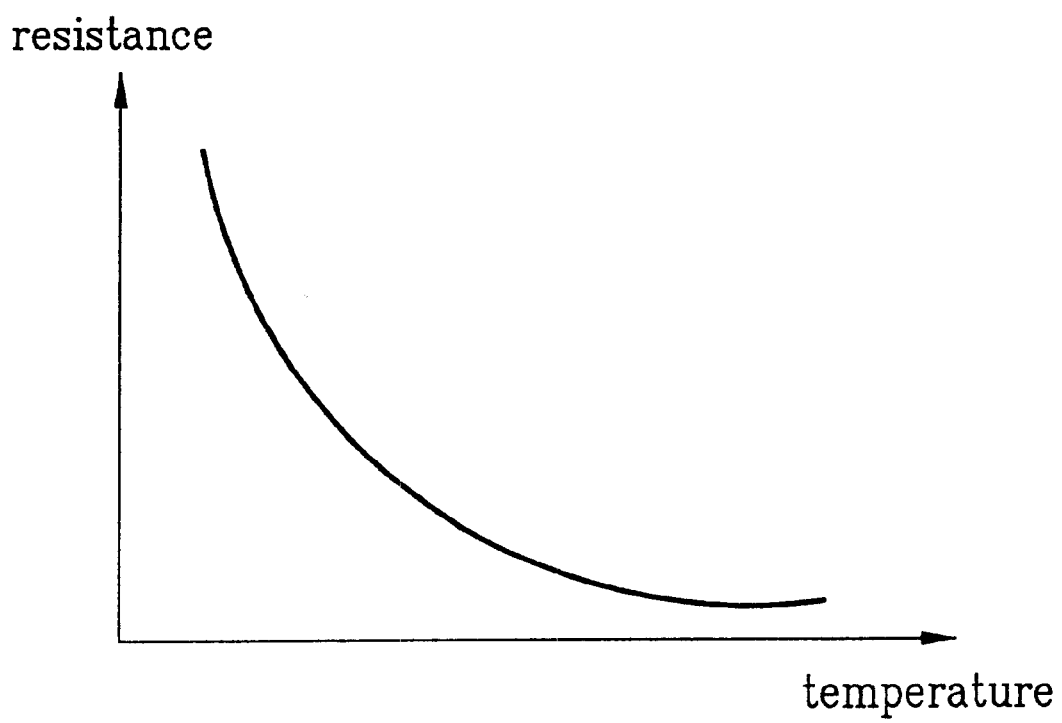

In the meantime, once the starting is completed, only the operation capacitance from the operation supporting capacitor 151 is provided to the supplementary winding 155 as the third switch 152 is turned off(or opened) during operation of the compressor 153. As explained, the switching control signal for the compressor 153 are dependent on the state of the utility voltage in an initial stage of operation of the compressor 153. That is, if the utility voltage is lower than reference voltages, a turn on time period of the third switch 152 is set longer, to make the compressor 153 started well even at a lower voltage. Opposite to this, if the utility voltage is higher than the reference voltages, the turn on time period of the third switch 152 is set shorter, for preventing flow of an excessive current to the main winding 154. In an initial starting of the compressor 153, if the second switch 148 is turned off to leave open and the negative temperature coefficient resister 147 is provided with the utility voltage, the negative temperature coefficient resister 147 limits the utility voltage thereby preventing an overcurrent from flowing to the main winding 154 of the compressor 153. The negative temperature coefficient resister 147 has an adequate initial resistance that can prevent a starting current supplied to the main winding 154 in the starting of the compressor not to exceed a preset reference starting current. That is, as shown in FIG. 12, since the negative temperature coefficient resister 147 has a characteristic that the higher the temperature thereof, the lower the resistance thereof, the negative temperature coefficient resister 147 limits the starting current to the main winding 154 of the compressor 153 by means of the initial resistance. In continuation, as shown in FIG. 12, if a current for the utility voltage is supplied to the negative temperature coefficient resister 147, the negative temperature coefficient resister itself generates heat to reduce the initial resistance, sharply. Then, upon completion of the starting after a while, the switching control signal turns on the second switch 148, to cut off the circuit, such that the current of the utility voltage flows to the main winding 154 through the second switch 148 in a regular size without passing through the negative temperature coefficient resister 147. As explained, if the third switch 152 is turned on and the negative temperature coefficient resister 147 comes into operation, to complete the starting of the compressor 153, the third switch 152 is turned off to leave open, to cut off the starting static capacitance supplied to the supplementary winding 155 through the starting capacitor 150. Accordingly, during operation of the compressor 153 after starting, the operating static capacitance is supplied to the supplementary winding 155 only through the operating capacitor 151. On the other hand, if the first switch 142 is turned off to leave open in response to a compressor driving control signal from the first controlling part 141, a main controlling part, owing to the user's selection, the utility voltage is supplied to the compressor 153 no more, to stop operation of the compressor 153.

As explained, the seventh embodiment device of the present invention permits, not only to enhance a starting effect, but also to prevent supply of excessive current to the main winding, by limiting a starting current supplied to the compressor in an initial starting by using a negative temperature coefficient resister which has a resistance reversely proportional to a temperature.

It will be apparent to those skilled in the art that various modifications and variations can be made in device and method for controlling supply of current and static capacitance to a compressor of the present invention without departing from the spirit or scope of the invention. Thus, it is intended that the present invention cover the modifications and variations of this invention provided they come within the scope of the appended claims and their equivalents.

What is claimed is:

1. A device for controlling a supply of a current and a static capacitance to a compressor comprising:
    a control signal generating part for providing a control signal for controlling the current and the static capacitance provided to the compressor, such that the current and the static capacitance differ between a starting period of the compressor and after the starting period;
    a current controlling part for limiting a current of a utility voltage in supplying current to a main winding in the starting period, and for releasing the limiting of the current of the utility voltage after the starting period, by changing an internal circuit in response to the control signal; and,
    a static capacitance controlling part for supplying a starting static from the current of the utility voltage to a supplementary winding in the starting period, and for supplying an operative static capacitance after the starting period, by changing an internal circuit in response to the control signal.

2. A device as claimed in claim 1, wherein the control signal generating part comprises:
    a transformer part for obtaining at least one voltage value from the utility voltage,
    a voltage size sensing part for sensing a size of the utility voltage from the obtained at least one voltage value, and
    a controlling part for generating the control signal depending on the sensed size of the voltage, and providing the control signal to the current controlling part and the static capacitance controlling part.

3. A device for controlling a supply of a current and a static capacitance to a compressor compnsing:
    a first controlling part for generating a driving turn on/off signal for the compressor according to a user's selection;
    a first switch for supplying, or cutting off the supplying of, a utility voltage to the compressor in response to the driving turn on/off signal;
    a second controlling part for generating a phase control signal and a switching control signal for the utility voltage depending on a size of the utility voltage;
    a current controlling part for changing an internal circuit in response to at least one of the switching control signal and the phase control signal, and for limiting a current of the utility voltage in supplying current to a main winding in a starting period of the compressor and for releasing the limiting of the current of the utility voltage after the starting period; and,
    a static capacitance controlling part for changing an internal circuit in response to the switching control signal, and for supplying a starting static capacitance from the current of the utility voltage to a supplementary winding in the starting period, and for supplying an operative static capacitance after the starting period.

4. A device as claimed in claim 3, wherein the current controlling part supplies a current to the main winding in a gradually increasing direction from an initial portion of the starting period to completion of the starting period in response to the switching control signal.

5. A device as claimed in claim 3, wherein the current controlling part comprises:
    a second switch for switching over an output contact point of the first switch and the main winding in response to the switching control signal, and
    a phase controlling part connected in parallel to the second switch between an input contact point and an output contact point of the second switch for controlling a phase of a voltage supplied to the main winding depending on a switching on/off state of the second switch and the phase control signal, and
    the static capacitance controlling part comprises:
    a third switch for switching over the supplementary winding and the output contact point of the first switch in response to the switching control signal, and
    a static capacitance generating part connected between the third switch and the supplementary winding for generating a static capacitance to the supplementary winding depending on a switching on/off state of the third switch.

6. A device as claimed in claim 5, wherein, in response to the switching control signal, the second switch connects the output contact point of the first switch and the main winding through the phase controlling part in the starting period, and connects the output contact point of the first switch and the main winding directly after the starting period.

7. A device as claimed in claim 5, wherein the phase controlling part is operative for a longer time by the phase control signal, if the utility voltage is lower than a reference utility voltage, and the phase controlling part is operative for a shorter time by the phase control signal, if the utility voltage is higher than the reference utility voltage.

8. A device as claimed in claim 5, wherein the phase controlling part is a triac for controlling a phase of the voltage supplied to the main winding in response to the phase controlling signal.

9. A device as claimed in claim 5, wherein the static capacitance generating part comprises:
  a starting capacitor connected between an output contact point of the third switch and the supplementary winding, and
  an operating capacitor connected between an input contact point of the third switch and the supplementary winding in parallel to the starting capacitor.

10. A device for controlling a supply of a current and a static capacitance to a compressor comprising:
  a first controlling part for generating a driving turn on/off signal for the compressor according to a user's selection;
  a first switch for supplying, or cutting off, the supplying of a utility voltage to the compressor in response to the driving turn on/off signal;
  a second controlling part for generating a phase control signal and a switching control signal for the utility voltage depending on a size of the utility voltage;
  a current controlling part for changing an internal circuit in response to at least one of the switching control signal and the phase control signal, and limiting a current of the utility voltage in supplying current to a main winding in a starting period of the compressor and for releasing the limiting of the current of the utility voltage after the starting period; and,
  a static capacitance controlling part for changing an internal circuit in response to the switching control signal, and for supplying a starting static capacitance from the current of the utility voltage to a supplementary winding in the starting period, and for supplying an operative static capacitance after the starting period, the static capacitance controlling part having an internal function for preventing a surge current caused by a momentary discharge.

11. A device as claimed in claim 10, wherein the current controlling part supplies current to the main winding in a gradually increasing direction from an initial portion of the starting period to completion of the starting period in response to the switching control signal.

12. A device as claimed in claim 10, wherein the current controlling part comprises:
  a second switch for switching over an output contact point of the first switch and the main winding in response to the switching control signal, and
  a phase controlling part connected in parallel to the second switch between an input contact point and an output contact point of the second switch for controlling a phase of a voltage supplied to the main winding depending on a switching on/off state of the second switch and the phase control signal, and the static capacitance controlling part comprises:
  a third switch for switching over the supplementary winding and the output contact point of the first switch in response to the switching control signal,
  a static capacitance generating part connected between the third switch and the supplementary winding for generating a static capacitance to the supplementary winding depending on a switching on/off state of the third switch, and
  a negative temperature coefficient resister connected between an output contact point of the third switch and the static capacitance generating part for preventing a surge current flowing to the third switch caused by a momentary discharge at the static capacitance generating part.

13. A device as claimed in claim 12, wherein, in response to the switching control signal, the second switch connects the output contact point of the first switch and the main winding through the phase controlling part in the starting period, and connects the output contact point of the first switch and the main winding directly after the starting period.

14. A device as claimed in claim 12, wherein the phase controlling part is operative for a longer time by the phase control signal, if the utility voltage is lower than a reference utility voltage, and the phase controlling part is operative for a shorter time by the phase control signal, if the utility voltage is higher than the reference utility voltage.

15. A device as claimed in claim 12, wherein the phase controlling part is a triac for controlling a phase of the voltage supplied to the main winding in response to the phase controlling signal.

16. A device as claimed in claim 12, wherein the static capacitance generating part comprises:
  an operative capacitor connected between an output contact point of the third switch and the supplementary winding for providing a fixed static capacitance to the supplementary winding in the starting period and after the starting period, and
  a starting capacitor connected between the negative temperature coefficient resister and the supplementary winding in series and to the starting capacitor in parallel for providing a starting capacitance.

17. A device as claimed in claim 10, wherein the current controlling part comprises:
  a second switch for switching over an output contact point of the first switch and the main winding in response to the switching control signal, and
  a phase controlling part connected in parallel to the second switch between an input contact point and an output contact point of the second switch for controlling a phase of a voltage supplied to the main winding depending on a switching state of the second switch, and the static capacitance controlling part comprises:
  a third switch for switching over the supplementary winding and the output contact point of the first switch in response to the switching control signal opposite to the second switch, and
  a static capacitance generating part connected between the third switch and the supplementary winding for providing a static capacitance to the supplementary winding depending on a switching state of the third switch in the starting period and after the starting period.

18. A device as claimed in claim 17, wherein, in response to the switching control signal, the second switch connects the output contact point of the first switch and the main winding through the phase controlling part in the starting period, and connects the output contact point of the first switch and the main winding directly after the starting period.

19. A device as claimed in claim 17, wherein the phase controlling part is operative for a longer time by the phase control signal, if the utility voltage is lower than a reference utility voltage, and the phase controlling part is operative for a shorter time by the phase control signal, if the utility voltage is higher than the reference utility voltage.

20. A device as claimed in claim 17, wherein the phase controlling part is a triac for controlling a phase of the voltage supplied to the main winding in response to the phase controlling signal.

21. A device as claimed in claim 17, wherein the static capacitance generating part comprises:
   a starting capacitor connected between an output contact point of the third switch and the supplementary winding, and
   an operating capacitor connected between an input contact point of the third switch and the supplementary winding in parallel to the starting capacitor.

22. A device for controlling a supply of a current and a static capacitance to a compressor comprising:
   a first controlling part for generating a driving turn on/off signal for the compressor according to a user's selection;
   a first switch for supplying, or cutting off the supplying of a utility voltage to the compressor in response to the driving turn on/off signal;
   a second controlling part for generating a phase control signal or a switching control signal for the utility voltage depending on a size of the utility voltage;
   a second switch having one input contact point connected to an output contact point of the first switch, a first output contact point and a second output contact point for connecting the input contact point to one of the two output contact points in response to the switching control signal;
   a current controlling part having an input terminal connected to an output contact point of the first switch, an output terminal connected to an first output contact point of the second switch for limiting a current of the utility voltage in supplying current to a main winding in a starting period of the compressor and for releasing the limiting of the current of the utility voltage after the starting period, according to an operation state of the second switch and the phase control signal; and,
   a static capacitance controlling part having a first input terminal connected to an output side of the first switch, a second input terminal connected to the second output contact point of the second switch, and an output terminal connected to the supplementary winding for supplying a starting static capacitance from the current of the utility voltage to a supplementary winding in the starting period, and for supplying an operative static capacitance after the starting period depending on an operation state of the second switch.

23. A device as claimed in claim 22, wherein the current controlling part supplies a current to the main winding in a gradually increasing direction from an initial portion of the starting period to completion of the starting period in response to the switching control signal.

24. A device as claimed in claim 22, wherein the current controlling part comprises:

a phase controlling part having an input terminal connected to an input contact terminal of the second switch, and an output terminal connected to a first output contact point of the second switch both in parallel for controlling a phase of a voltage supplied to the main winding depending on a switching state of the second switch and the phase control signal, and the static capacitance controlling part includes a static capacitance generating part having a first input terminal connected to an input contact point of the second switch, a second input terminal connected to a second output contact point of the second switch, and the output terminal connected to the supplementary winding, for providing a static capacitance to the supplementary winding depending on an operation state of the second switch.

25. A device as claimed in claim 24, wherein the phase controlling part is operative for a longer time by the phase control signal, if the utility voltage is lower than a reference utility voltage, and the phase controlling part is operative for a shorter time by the phase control signal, if the utility voltage is higher than the reference utility voltage.

26. A device as claimed in claim 24, wherein the phase controlling part is a triac for controlling a phase of the voltage supplied to the main winding in response to the phase controlling signal.

27. A device as claimed in claim 24, wherein the static capacitance generating part comprises:
   an operative capacitor connected between an output contact point of the third switch and the supplementary winding for providing an operating static capacitance to the supplementary winding in a starting period and after the starting period, and
   a starting capacitor connected between the supplementary winding and the second output contact point of the second switch and to the operating capacitor in parallel for providing a starting static capacitance to the supplementary winding.

28. A device as claimed in claim 27, wherein the second switch is operated such that the input contact point is connected to the second output contact point in the starting period in response to the switching control signal, and changed over to the first output contact point after the starting period in response to the switching control signal.

29. A device for controlling a supply of a current and a static capacitance to a compressor comprising:
   a first controlling part for generating a driving turn on/off signal for the compressor according to a user's selection;
   a first switch for supplying, or cutting off the supplying of, a utility voltage to the compressor in response to the driving turn on/off signal;
   a temperature sensor for sensing an external temperature of the compressor and providing the sensed temperature;
   a second controlling part for generating a phase control signal and a switching control signal for the utility voltage depending on a size and a frequency of the utility voltage, and the external temperature;
   a current controlling part for changing an internal circuit in response to the switching control signal and the phase control signal, and for limiting a current of the utility voltage in supplying current to a main winding in a starting period of the compressor and releasing the limiting of the current of the utility voltage after the starting period; and, a static capacitance controlling part for changing an internal circuit in response to the switching control signal, and for supplying a starting static capacitance from the current of the utility voltage to a supplementary winding in the starting period, and for supplying an operative static capacitance after the starting period.

30. A device as claimed in claim 29, wherein the current controlling part supplies a current to the main winding in a gradually increasing direction from an initial portion of the starting period to completion of the starting period in response to the switching control signal.

31. A device for controlling a supply of a current and a static capacitance to a compressor comprising:

a first controlling part for generating a driving turn on/off signal for the compressor according to a user's selection;

a first switch for supplying, or cutting off the supplying of, a utility voltage to the compressor in response to the driving turn on/off signal;

a second controlling part for generating a phase control signal and a switching control signal for the utility voltage depending on a size, and providing a display signal relating to a state of current flowing to the main winding;

a current controlling part for changing an internal circuit in response to at least one of the switching control signal and the phase control signal, and for limiting a current of the utility voltage in supplying current to a main winding in a starting period of the compressor and for releasing the limiting of the current of the utility voltage after the starting period;

a current detecting part connected to the current controlling part for detecting the current to the main winding;

a display part for displaying a state of current to the main winding in response to the display signal; and, a static capacitance controlling part for supplying a starting static capacitance from the current of the utility voltage to a supplementary winding in the starting period, and for supplying an operative static capacitance after the starting period in response to the switching control signal, the static capacitance controlling part having an internal function for preventing a surge current caused by momentary discharge.

32. A device as claimed in claim 31, wherein the current detecting part is a resistor connected between the current controlling part and the main winding.

33. A device as claimed in claim 31, wherein the display part is an LED.

34. A device as claimed in claim 33, wherein, in response to the display signal, the LED flashes if the detected current to the main winding is greater than a preset first overcurrent, the LED is turned on if the detected current to the main winding is smaller than the preset first overcurrent and greater than a preset second overcurrent (the first overcurrent>the second overcurrent), and the LED is turned off if the detected current to the main winding is lower than the preset second overcurrent.

35. A device as claimed in claim 31, wherein the current controlling part supplies a current to the main winding in a gradually increasing direction from an initial portion of the starting period to completion of the starting period in response to the switching control signal.

36. A device as claimed in claim 31, wherein the current controlling part comprises:

a second switch for switching over an output contact point of the first switch and the main winding in response to the switching control signal, and a phase controlling part connected in parallel to the second switch between an input contact point and an output contact point of the second switch for controlling a phase of a voltage supplied to the main winding depending on a switching state of the second switch, and the static capacitance controlling part comprises:

a third switch for switching over the supplementary winding and the output contact point of the first switch in response to the switching control signal, and a static capacitance generating part connected between the third switch and the supplementary winding for providing a static capacitance to the supplementary winding depending on a switching state of the third switch.

37. A device as claimed in claim 36, wherein, in response to the switching control signal, the second switch connects the output contact point of the first switch and the main winding through the phase controlling part in the starting period, and connects the output contact point of the first switch and the main winding directly after the starting period.

38. A device as claimed in claim 36, wherein the phase controlling part is operative for a longer time by the phase control signal, if the utility voltage is lower than a reference utility voltage, and the phase controlling part is operative for a shorter time by the phase control signal, if the utility voltage is higher than the reference utility voltage.

39. A device as claimed in claim 36, wherein the phase controlling part is a triac for controlling a phase of the voltage supplied to the main winding in response to the phase controlling signal in the starting period.

40. A device as claimed in claim 36, wherein the static capacitance generating part comprises:

a starting capacitor connected between an output contact point of the third switch and the supplementary winding for providing a starting static capacitance to the supplementary winding, and an operating capacitor connected in series between the third switch and the supplementary winding and to the starting capacitor in parallel for providing an operating static capacitance in the starting period and during operation, after the starting period.

41. A device for controlling a supply of a current and a static capacitance to a compressor comprising:

a first controlling part for generating a driving turn on/off signal for the compressor according to a user's selection;

a first switch for supplying, or cutting off the supplying of a utility voltage to the compressor in response to the driving turn on/off signal;

a second controlling part for generating a phase control signal and a switching control signal, which vary dependent upon a state of current to a main winding of the compressor and a size of the utility voltage, and which are different in a starting period of the compressor and after the starting period;

a current controlling part for changing an internal circuit in response to at least one of the switching control signal and the phase control signal, and for limiting a current of the utility voltage in supplying current to a main winding in the starting period and for releasing the limiting of the current of the utility voltage after the starting period;

a current detecting part connected to the current controlling part for detecting the current to the main winding; and, a static capacitance controlling part for changing an internal circuit in response to the switching control signal, and for supplying a starting static capacitance from the current of the utility voltage to a supplementary winding in the starting period, and for supplying an operative static capacitance after the starting period.

42. A device as claimed in claim 41, wherein the current detecting part is a resistor connected between the current controlling part and the main winding.

43. A device as claimed in claim 41, wherein the current controlling part supplies a current to the main winding in a gradually increasing direction from an initial portion of the starting period to completion of the starting period in response to the switching control signal.

44. A device as claimed in claim 41, wherein the current controlling part comprises:
   a second switch having an input contact point connected to an output contact point of the first switch and an output contact point connected to the main winding for switching over an output contact point of the first switch and the main winding in response to the switching control signal, and
   a phase controlling part having an input terminal connected to an input contact point of the second switch and an output terminal connected to an input terminal of the current detecting part for controlling a size of the current supplied to the main winding depending on a state of switching of the second switch and the phase control signal, and
   the static capacitance controlling part comprises:
      a third switch for switching over the supplementary winding and the output contact point of the first switch in response to the switching control signal, and
   a static capacitance generating part connected between the third switch and the supplementary winding for providing a static capacitance to the supplementary winding depending on a switching state of the third switch.

45. A device as claimed in claim 44, wherein, in response to the switching control signal, the second switch connects the output contact point of the first switch and the main winding through the phase controlling part in the starting period, and connects the output contact point of the first switch and the main winding directly after the starting period.

46. A device as claimed in claim 44, wherein the phase controlling part is operative for a longer time by the phase control signal, if the utility voltage is lower than a reference utility voltage, and the phase controlling part is operative for a shorter time by the phase control signal, if the utility voltage is higher than the reference utility voltage.

47. A device as claimed in claim 44, wherein the phase controlling part is a triac for controlling a phase of the voltage supplied to the main winding in response to the phase controlling signal from the second controlling part.

48. A device as claimed in claim 44, wherein the static capacitance generating part comprises:
   a starting capacitor connected between an output contact point of the third switch and the supplementary winding for providing a starting static capacitance to the supplementary winding, and
   an operating capacitor connected in series between the third switch and the supplementary winding and to the starting capacitor in parallel for providing an operating static capacitance in the starting period and during operation, after the starting period.

49. A device for controlling a supply of a current and a static capacitance to a compressor comprising:
   a first controlling part for generating a driving turn on/off signal for the compressor according to a user's selection;
   a first switch for supplying a utility voltage to the compressor in response to the driving turn on/off signal;
   a second controlling part for generating a switching control signal which differs between a starting period of the compressor and after the starting period;
   a current controlling part having variable resistance characteristics reversely proportional to a temperature for changing an internal circuit in response to the switching control signal, to limit a current of the utility voltage in supplying current to a main winding in the starting period and to release the limiting of the current of the utility voltage after the starting period; and,
   a static capacitance controlling part for changing an internal circuit in response to the switching control signal, and for supplying a starting static capacitance from the current of the utility voltage to a supplementary winding in the starting period, and for supplying an operative static capacitance after the starting period.

50. A device as claimed in claim 49, wherein the current controlling part supplies a current to the main winding in a gradually increasing direction from an initial portion of the starting period to completion of the starting period in response to the switching control signal.

51. A device as claimed in claim 49, wherein the current controlling part comprises:
   a second switch having an input contact point connected to an output contact point of the first switch and an output contact point connected to the main winding for switching over an output contact point of the first switch and the main winding in response to the switching control signal, and
   a negative temperature coefficient resister connected in series between an output terminal of the first switch and the main winding and to the second switch in parallel for limiting a size of current supplied to the main winding in the starting period, and
   the static capacitance controlling part comprises:
      a third switch for switching over the supplementary winding and the output contact point of the first switch in response to the switching control signal, and
   a static capacitance generating part connected between the third switch and the supplementary winding for providing a static capacitance to the supplementary winding depending on a switching state of the third switch.

52. A device as claimed in claim 51, wherein, in response to the switching control signal, the second switch connects the output contact point of the first switch and the main winding through the phase controlling part in the starting period, and connects the output contact point of the first switch and the main winding directly after the starting period.

53. A device as claimed in claim 51, wherein the static capacitance generating part comprises:
   a starting capacitor connected between an output contact point of the third switch and the supplementary winding for providing a starting static capacitance to the supplementary winding, and
   an operating capacitor connected in series between the third switch and the supplementary winding and to the starting capacitor in parallel for providing an operating static capacitance in the starting period and during operation, after the starting period.

54. A method for controlling a supply of a current and a static capacitance to a compressor, comprising the steps of:

(a) limiting a current of a utility voltage in supplying current to a main winding during a starting period of the compressor, and releasing the limiting of the current of the utility voltage after the starting period; and, (b) providing a starting static capacitance from the current to a supplementary winding during the starting period of the compressor, and providing an operative static capacitance after the starting period.

55. A method as claimed in claim 54, wherein the step (a) includes the step of limiting the current by limiting a phase thereof.

56. A method as claimed in claim 54, wherein the step (a) includes the step of limiting the current less if the provided utility voltage is lower than a reference utility voltage, and more if the provided utility voltage is higher than the reference utility voltage.

57. A method as claimed in claim 54, wherein, when the starting period is divided into an initial starting period, a middle starting period, and a final starting period, the current to the main winding has a limited value of a first size in the initial starting period, the current to the main winding has a value gradually increasing from the first size to a second size in the middle starting period, and the current to the main winding is maintained to be the second size while the compressor is in operation starting from the final starting period.

58. A method as claimed in claim 54, further comprising the steps of:

(c) sensing a size and a frequency of the utility voltage; and, (d) controlling a phase of current to the main winding of the compressor according to the sensed size of the utility voltage.

59. A method as claimed in claim 54, further comprising the steps of:

(c) sensing an external temperature; and, (d) variably controlling the phase of the current to the main winding of the compressor according to the sensed external temperature.

60. A method as claimed in claim 59, wherein the step (d) includes the steps of:

(d1) comparing the sensed temperature value to a preset reference value according to seasons; and, (d2) controlling the phase of current to the main winding according to a result of the comparison.

61. A method as claimed in claim 54, further comprising the steps of:

(c) sensing the current to the main winding at the starting period;

(d) comparing the sensed current to at least one preset reference value; and, (e) displaying a state of the current to the main winding on a display according to a result of the comparison.

62. A method as claimed in claim 61, wherein the display is an LED.

63. A method as claimed in claim 61, wherein the step (e) includes the steps of flashing the display if the sensed current is greater than a first preset overcurrent, turning on the display if the sensed current is smaller than the first preset overcurrent and greater than a second preset overcurrent (the first overcurrent>the second overcurrent), and stopping operation of the display if the sensed current is smaller than the second preset overcurrent considering that the state of the current is normal.

64. A method as claimed in claim 54, further comprising the steps of:

detecting the current value to the main winding during the starting period, obtaining a starting voltage value from the detected current value, comparing the starting voltage value to at least one reference voltage value, and controlling a phase of the current to the main winding according to a result of the comparison.

65. A method as claimed in claim 64, wherein the step of controlling a phase includes the step of cutting off supply of the current to stop driving of the compressor if the starting voltage value is greater than a preset first reference voltage, controlling a phase of the current to reduce a size of the current value if the starting voltage is lower than the first reference voltage and greater than a preset second reference voltage, and maintaining the current value if the starting voltage value is lower than the second reference voltage value.

66. A method as claimed in claim 54, wherein the size of the current to the main winding during the starting period is limited by a negative temperature coefficient resister.

67. A method as claimed in claim 54, wherein the size of the current to the main winding during the starting period is limited by a triac.

\* \* \* \* \*